US011982561B2

(12) United States Patent
Cerutti et al.

(10) Patent No.: US 11,982,561 B2
(45) Date of Patent: May 14, 2024

(54) LEVEL SENSOR FOR DETECTING THE LEVEL OF A MEDIUM

(71) Applicant: ELTEK S.p.A., Casale Monferrato (IT)

(72) Inventors: Fulvio Cerutti, Casale Monferrato (IT); Stefano Allera, Casale Monferrato (IT); Massimo Zanin, Casale Monferrato (IT); Matteo Rondano, Casale Monferrato (IT); Giorgio Fagnola, Casale Monferrato (IT); Mauro Zorzetto, Casale Monferrato (IT); Marco Pizzi, Casale Monferrato (IT)

(73) Assignee: ELTEK S.p.A, Casale Monferrato (IT)

( * ) Notice: Subject to any disclaimer, the term of this patent is extended or adjusted under 35 U.S.C. 154(b) by 440 days.

(21) Appl. No.: 17/282,222

(22) PCT Filed: Oct. 3, 2019

(86) PCT No.: PCT/IB2019/058432
§ 371 (c)(1),
(2) Date: Apr. 1, 2021

(87) PCT Pub. No.: WO2020/070690
PCT Pub. Date: Apr. 9, 2020

(65) Prior Publication Data
US 2021/0333140 A1    Oct. 28, 2021

(30) Foreign Application Priority Data

Oct. 3, 2018    (IT) .................. 102018000009136

(51) Int. Cl.
*G01F 23/263*    (2022.01)
*G01F 23/24*    (2006.01)
*G01F 25/20*    (2022.01)

(52) U.S. Cl.
CPC ............ *G01F 23/268* (2013.01); *G01F 23/24* (2013.01); *G01F 23/266* (2013.01); *G01F 25/20* (2022.01)

(58) Field of Classification Search
CPC ...... G01F 23/268; G01F 23/24; G01F 23/266; G01F 25/20
See application file for complete search history.

(56) References Cited

U.S. PATENT DOCUMENTS

2009/0301188 A1\* 12/2009 Calcote .................. G01F 23/265
                                                    73/304 C
2011/0120219 A1    5/2011 Barlesi et al.
(Continued)

FOREIGN PATENT DOCUMENTS

CN        104781858 A    7/2015
JP        62-180726 U    11/1987
(Continued)

OTHER PUBLICATIONS

International Search Report and Written Opinion of the ISA for PCT/IB2019/058432, dated Nov. 27, 2019, 13 pages.

*Primary Examiner* — Xin Y Zhong
(74) *Attorney, Agent, or Firm* — Nixon & Vanderhye P.C.

(57) ABSTRACT

A level sensor comprises an electrical-connection structure and a level-detection structure. The level-detection structure comprises a plurality of elongated electrodes, which include at least three measuring electrodes. The elongated electrodes extend at least partially in side-by-sidey positions in a length direction of the level-detection structure and each have a proximal end and a distal end relative to the electrical-connection structure. The level-detection structure is divided, in the length direction, into a succession of detection sections, each of which includes two effective portions of two respective measuring electrodes, the two effective portions extending to a prevalent extent substantially parallel and equidistant, at a first predetermined distance from each other, in the length direction. In the detection sections there also extends, in the length direction, a non-effective portion of one further elongated electrode other than the two measuring electrodes that define the two effective portions of the corresponding detection section, the at least one further elongated electrode being one measuring electrode or else a reference electrode. The elongated electrodes are shaped in such a way that, at one or more of the detection sections, the non-effective portion of the at least one further elongated electrode extends to a prevalent extent at respective second predetermined distances from the corresponding two effective portions, the second predetermined distances being greater than the first predetermined distance.

20 Claims, 23 Drawing Sheets

(56) References Cited

U.S. PATENT DOCUMENTS

| | | |
|---|---|---|
| 2013/0283905 A1 | 10/2013 | Kataoka et al. |
| 2015/0114506 A1 | 4/2015 | Tichborne et al. |
| 2015/0204708 A1* | 7/2015 | Nichols ................ G01F 23/265 73/304 R |
| 2017/0299416 A1 | 10/2017 | Rondano et al. |

FOREIGN PATENT DOCUMENTS

| | | |
|---|---|---|
| JP | 2014-092453 A | 5/2014 |
| WO | 2012/095996 A1 | 7/2012 |

* cited by examiner

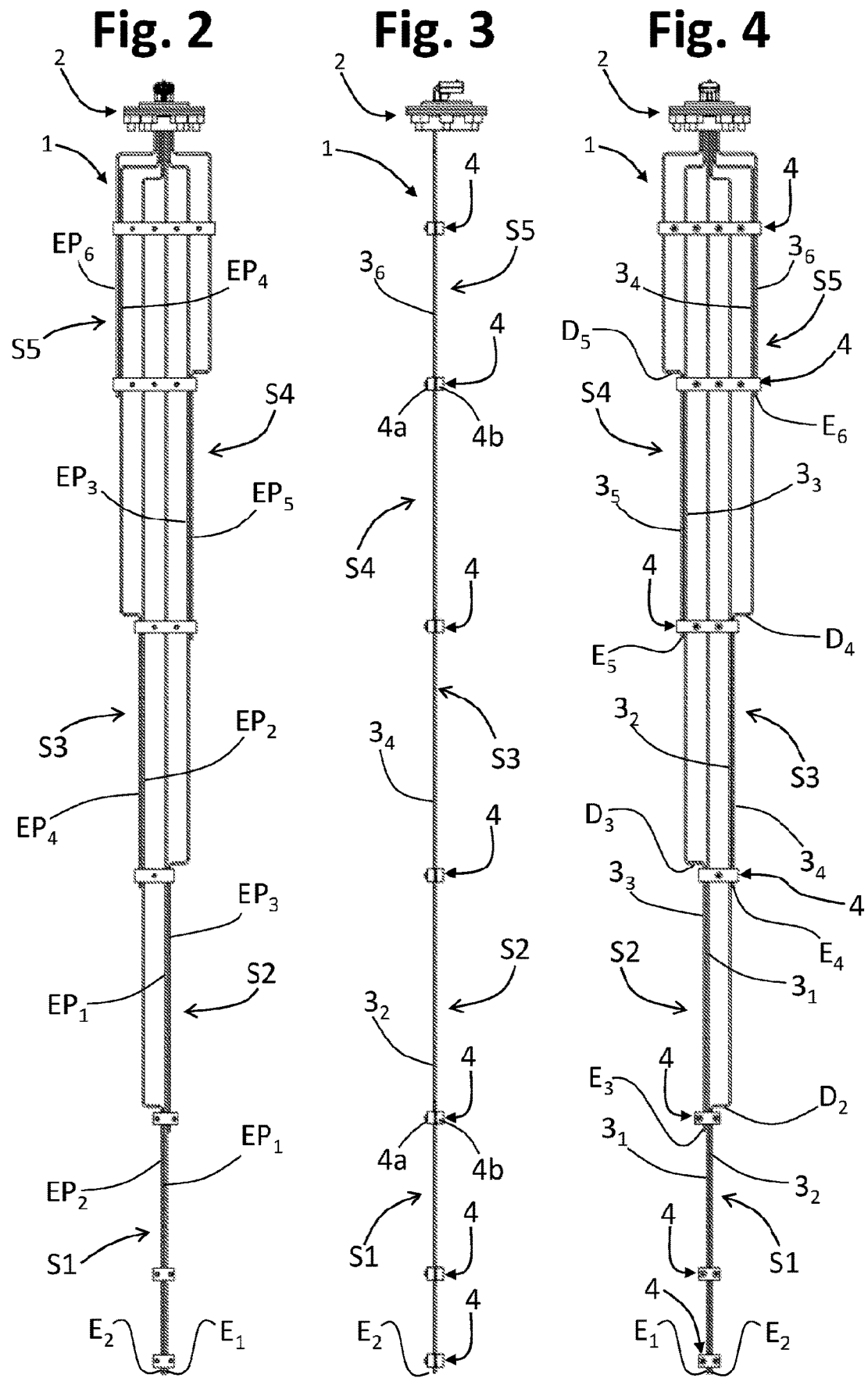

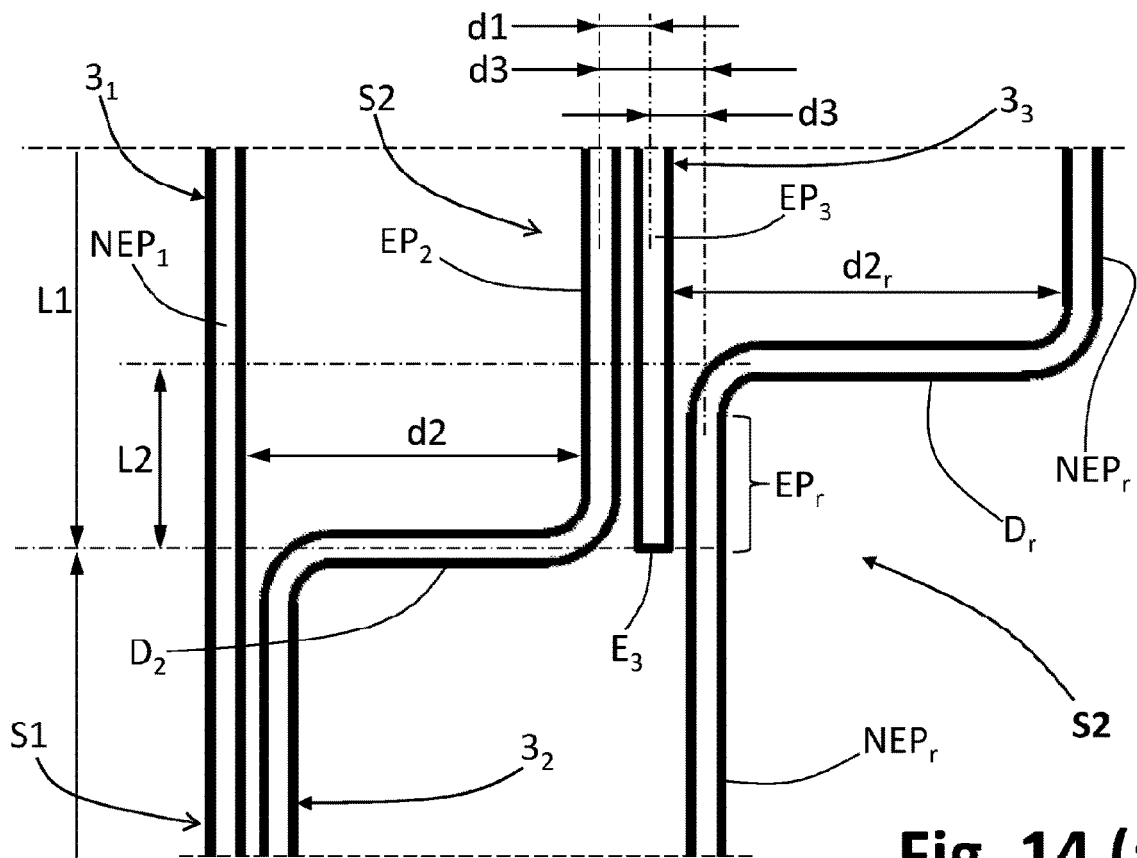
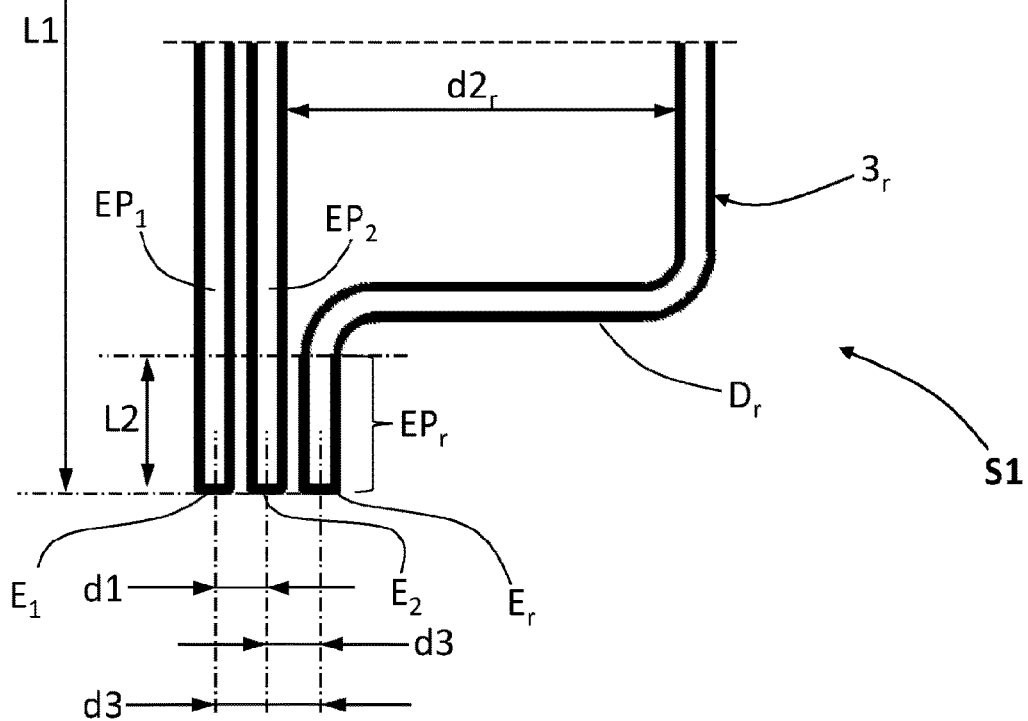
Fig. 14 (a)

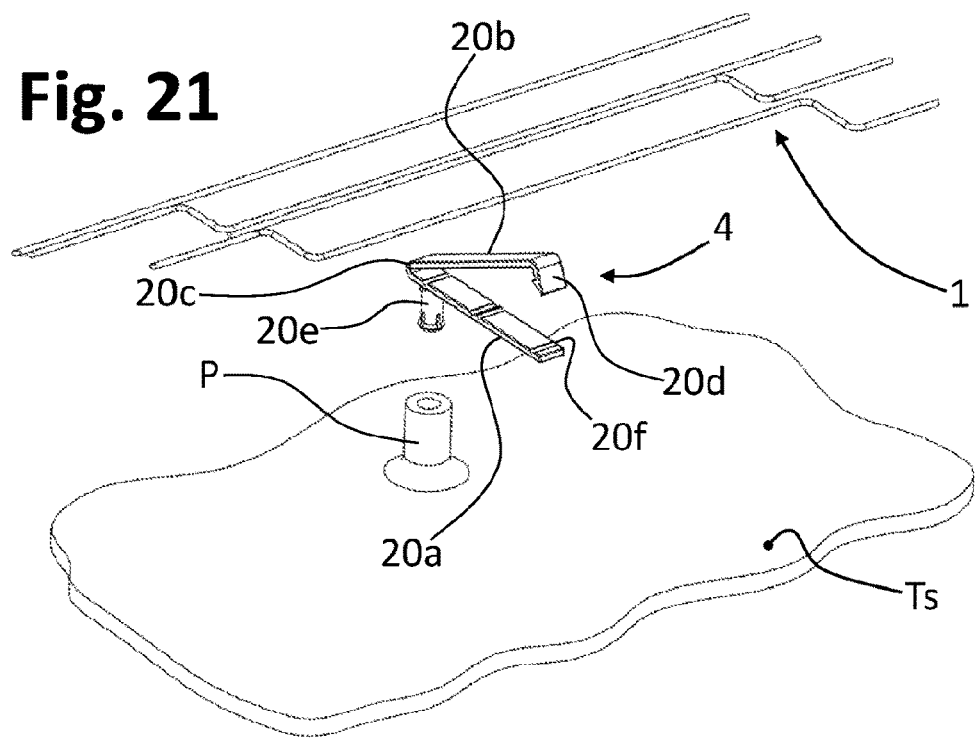
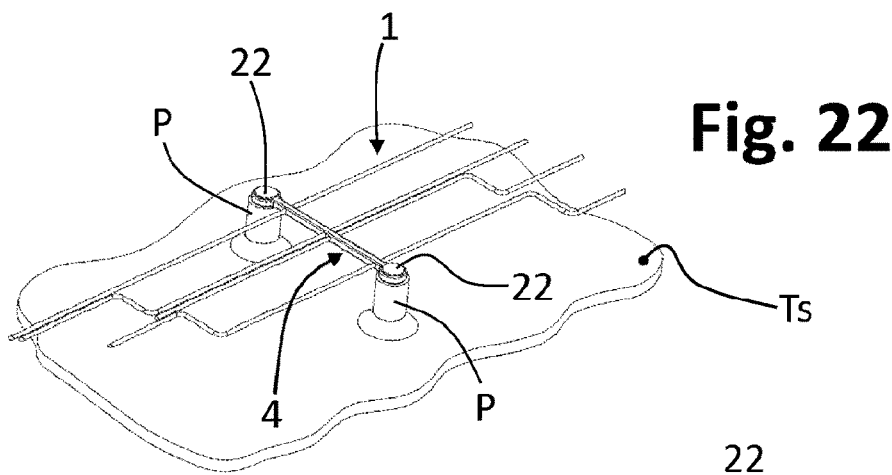

LEVEL SENSOR FOR DETECTING THE LEVEL OF A MEDIUM

This application is the U.S. national phase of International Application No. PCT/IB2019/058432 filed 3 Oct. 2019, which designated the U.S. and claims priority to IT Patent Application No. 102018000009136 filed 3 Oct. 2018, the entire contents of each of which are hereby incorporated by reference.

FIELD OF THE INVENTION

The present invention relates to sensors for detecting the level of a generic medium, such as a liquid, a fluid substance, a powdery material or a material in the bulk state, etc. The invention has been developed with particular reference to sensors that are to be installed or integrated in vehicle tanks, for example fuel tanks or tanks for additives necessary for operation of a motor-vehicle engine.

PRIOR ART

Level sensors are used in various contexts for detecting a residual amount of a liquid present in a generic container, such as a tank. Some of these sensors are based upon the measurement of electrical quantities, such as capacitance or impedance. Basically, in the aforesaid sensors, by processing the value of a certain electrical quantity detected between a plurality of measuring electrodes, the sensor identifies an area of transition between the liquid and the air in the tank, which is considered as indicating the level of the liquid.

With reference, for example, to level sensors designed to detect a capacitance, and/or an impedance, these typically envisage at least two facing electrodes, between which the liquid the level of which is to be detected is designed to penetrate, with the aforesaid electrodes that are excited via an oscillator circuit, i.e., a circuit that generates an a.c. electrical signal or a frequency-modulated electrical signal.

The circuit detects at least one variation of the capacitance between the facing electrodes that is proportional to the variation of the dielectric set between the electrodes, i.e., proportional to the level of the liquid present between them, and hence to the variation of the capacitance of the sensor element. In such sensors an output signal proportional to the aforesaid variation of capacitance is thus obtained.

There have been proposed various types of capacitive sensors, which, even though they present a linear and repeatable behaviour for a given value of dielectric constant of the liquid, may present a marked variability in the case where the composition of the liquid itself varies, for example a fuel such as diesel or petrol with variable percentages of other substances, for example water or ethanol. There may moreover arise a stratification, whether caused by immiscible fluids, such as water and fuel, or by temperature gradients or again, for example, during refuelling (for instance, refuelling with a petrol containing a high percentage of ethanol on a purer petrol base): all this introduces difficulties in measurement.

The ideal approach would be to provide a completely digital capacitive sensor, in which each electrode measures a portion of level in a discrete way, in on-off mode, exploiting the difference, which is in any case high, between the permittivity of the air and that of the fluid. Since it is necessary, however, to measure a depth that is frequently in the region of one metre or higher, with a precision of the order of a millimetre, an extremely large number of electrodes would be necessary, of the order of $10^3$, that are to be managed independently. This approach is clearly not convenient either in terms of cost or in terms of encumbrance.

Known sensors based upon the measurement of an electrical quantity, and in particular of a capacitance, are moreover frequently affected by detection errors due to electrical disturbance or parasitic capacitances.

AIM AND SUMMARY OF THE INVENTION

In its general terms, the present invention has the aim to provide a level sensor which is simple and economically advantageous to produce, which is distinguished by a high flexibility of use, and the detections of which are less affected by electrical noise, such as electrical disturbance, and/or faults of measurement, also due to parasitic capacitances.

The above and other aims still, which will emerge clearly hereinafter, are achieved according to the present invention by a level sensor having the characteristics specified in the annexed claims. The claims form an integral part of the technical teaching provided herein in relation to the invention.

BRIEF DESCRIPTION OF THE DRAWINGS

Further aims, characteristics, and advantages of the present invention will emerge clearly from the ensuing detailed description, with reference to the annexed drawings, which are provided purely by way of non-limiting example and in which:

FIGS. 2, 3, and 4 are views in elevation, respectively a rear view, a side view, and a front view, of the level sensor of FIG. 1;

FIGS. 20 to 31 are partial and schematic perspective views aimed at exemplifying various possible embodiments of a positioning and/or fixing element that can be used in a level sensor according to possible embodiments of the invention.

DEFINITIONS

Figure 1:
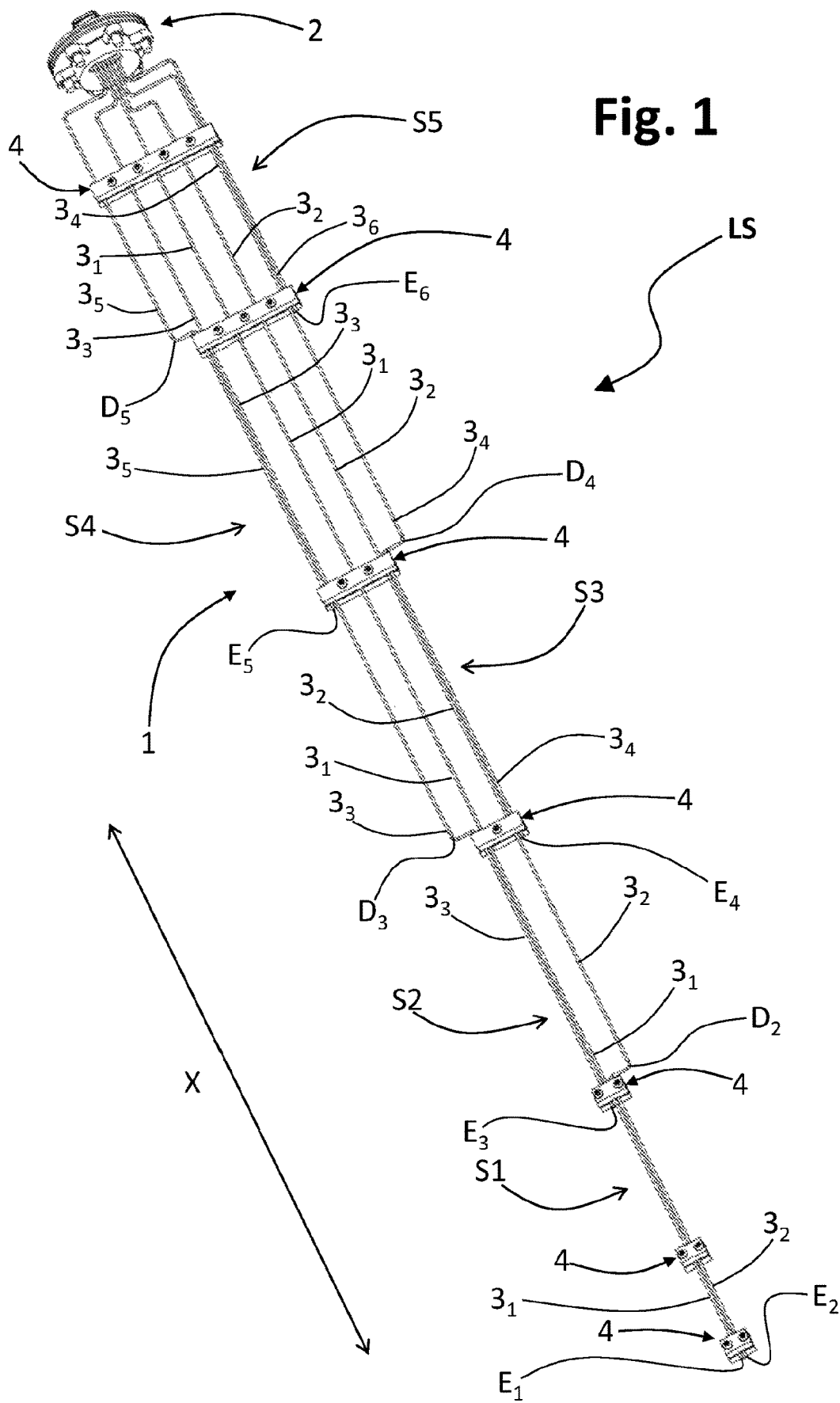
FIG. 1 is a schematic perspective view of a level sensor according to possible embodiments of the invention.

In the present description and in the attached claims:
the generic terms "material" and "liquid" are to be understood as including mixtures, compositions, or combinations of a number of different materials, substances, or liquids;
the term "effective", when referring to an axial portion of one of the electrodes described hereinafter, is intended to mean that that particular portion of electrode is used in an active way for the purposes of level measurement in a certain detection section of the level sensor; conversely, the term "non-effective", when referring to an axial portion of one of the aforesaid electrodes, is intended to mean that that particular portion of electrode is not used in an active way for the purposes of level measurement in a certain detection section of the level sensor that comprises two effective portions;
the generic term "step" is understood as designating an intermediate bend or shaping of an electrode, such that an intermediate portion of the electrode itself extends in a direction generally transverse, preferably substantially perpendicular or angled, with respect to a direction of length of the sensor or a level-detecting direction;
the generic terms "prevalent", "prevalently", or "to a prevalent extent" are to be understood according to their common meaning, namely, for qualifying a portion of a certain quantity, such as a length, a distance, a width, etc., that is quantitatively larger than the remaining portion; thus, for example, if two portions of two aforesaid electrodes are referred to as extending "prevalently" or "to a prevalent extent" substantially parallel to one another, this means that the aforesaid two electrode portions extend parallel to one another for the majority of their length (i.e., more than half, preferably more than two thirds), without thereby excluding that short stretches of the aforesaid portions may not be parallel to one another; likewise, if two electrode portions are referred to as extending "prevalently" or "to a prevalent extent" at a first distance from one another, this means that the aforesaid two portions extend at the aforementioned first distance from one another for the majority of their length (i.e., more than half, preferably more than two thirds), without thereby excluding that short stretches of the aforesaid portions may extend at a different distance from one another.

DESCRIPTION OF PREFERRED
EMBODIMENTS OF THE INVENTION

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" and the like that may be present in different points of this description do not necessarily refer to one and the same embodiment. Moreover, particular conformations, structures, or characteristics defined in the framework of the present description may be combined in any adequate way in one or more embodiments, even different from the ones represented. The reference numbers and spatial references (such as "upper", "lower", "top", "bottom", etc.) used herein are only provided for convenience and hence do not define the sphere of protection or the scope of the embodiments.

With initial reference to FIGS. 1-4, designated as a whole by LS is a level sensor according to possible embodiments, for detecting the level of a liquid. The sensor LS comprises at least one level-detection structure, designated by 1, and an electrical-connection structure, designated by 2, which in various preferential embodiments integrates also an electronic control circuit.

The detection structure 1 is the part of the sensor LS that is to be at least partially immersed in the liquid undergoing measurement, and for this purposes it extends in a direction of length X. According to the type of installation of the sensor, the direction of length X may substantially correspond to the direction of measurement of the level of the liquid; i.e., it may be substantially vertical. However, the fact that the supporting structure 2 extends generally in the direction of length does not necessarily imply that the aforesaid structure extends completely vertically or upright: as will be seen, in fact, in various embodiments, the structure 2 may extend inclined in the liquid, or may comprise a number of stretches of structure that have an inclination different from one another.

The connection structure 2 substantially forms an interface for connection of the sensor LS to an external system (for example, an electronic control unit on board a vehicle) and as has been mentioned may possibly integrate directly an electronic control circuitry of the level sensor. As will emerge clearly hereinafter, the sensor LS may include even a number of detection structures 1 electrically connected to one and the same connection structure 2.

The detection structure 1 comprises a plurality of elongated electrodes, which, preferably but not necessarily, are filiform and, in various embodiments, are constituted by wires or rods of electrically conductive material, for example a metal material. In other embodiments not represented, the aforesaid elongated electrodes may be constituted by tracks of electrically conductive material deposited or in any case laid on a support, for example a printed-circuit board (PCB).

In the case exemplified in FIGS. 1-4, the detection structure 1 includes six electrodes, designated by the references from $3_1$-$3_6$, but, more in general, the technical solution according to the invention may be applied in the case of detection structures 1 that include at least three measuring electrodes, i.e., ones effectively used for the purposes of level detection. In the case of FIGS. 1-4, all the electrodes $3_1$-$3_6$ are measuring electrodes, but, in other embodiments, the structure 1 may include a plurality of measuring electrodes and at least one further calibration or reference electrode, as exemplified hereinafter.

The various electrodes $3_1$-$3_6$ preferably have different lengths and are electrically connected to the electrical-connection structure 2, for example in the way described hereinafter.

The electrodes $3_1$-$3_6$ extend at least partially in positions generally set side by side in the direction of length X so as to have each a proximal end and a distal end, relative to the connection structure 2; in the figures, only the distal ends of the electrodes are designated by $3_1$-$3_6$ and $E_1$-$E_6$, respectively, which are electrically insulated or separate from each other.

In various embodiments, the proximal ends of the electrodes are directly associated to the structure 2, preferably at one and the same height. In various embodiments, such as the one exemplified, the distal ends of at least some of the electrodes $3_1$-$3_6$ are located, instead, at different heights in the direction of length X: with reference, for example, to the case illustrated in FIGS. 1 to 4, the two electrodes designated by $3_1$ and $3_2$ have the respective distal ends $E_1$ and $E_2$ substantially at the same height, whereas the other electrodes $3_3$-$3_6$ have their distal ends $E_3$-$E_6$ at different heights along the axis X. This does not constitute an essential characteristic of the invention, but is, however, advantageous for the reasons explained hereinafter.

The structure 1 is divided, in the direction X, into a succession of different detection areas or sections, which in the example of FIGS. 1-4 are designated by S1-S5. In the example, the various sections S1-S4 have substantially the same height (or length), but this does not constitute an essential characteristic. As it can be noticed, in the example, the number of the detection sections S1-S5 is smaller than the number of the electrodes $3_1$-$3_6$.

According to one aspect of the invention, each detection section S1-S5 comprises two effective portions of two respective electrodes $3_1$-$3_6$. As mentioned previously, the terms "effective" and "non-effective", when referring to an axial portion of a measuring electrode (i.e., that extends in the length or measuring direction), mean that the particular electrode portion is used in an active way, or else is not used, respectively, for the purposes of level measurement in a certain detection section S1-S5.

The aforesaid effective portions of the electrodes $3_1$-$3_6$ are designated in FIG. 2 by the references from $EP_1$ to $EP_6$, respectively. As may be noted from FIG. 2, at each detection section S1-S5 there extend two effective portions, represented in particular by the pair of portions $EP_1$, $EP_2$ in the section S1, by the pair of portions $EP_1$, $EP_3$ at the section S2, by the pair of portions $EP_2$, $EP_4$ at the section S3, by the pair of portions $EP_3$, $EP_5$ at the section S4, and by the pair of portions $EP_4$, $EP_6$ at the section S5.

In various embodiments, one and the same electrode $3_1$-$3_6$ may define more than one effective portion, at different heights, each belonging to a different detection section: in the case exemplified, for example, the electrode $3_1$ defines respective effective portions $EP_1$ at the sections S1 and S2, the electrode $3_2$ defines respective effective portions $EP_2$ at the sections S1 and S3, the electrode $3_3$ defines respective effective portions $EP_3$ at the sections S2 and S4, the electrode $3_4$ defines respective effective portions $EP_4$ at the sections S3 and S5, whereas the electrodes $3_5$ and $3_6$ each define just one effective portion $EP_5$ and $EP_6$ at the sections S4 and S5, respectively.

In general, the distal end $E_1$-$E_6$ of an electrode will be located, according to the cases, at the end of its single effective portion (electrodes $3_5$ and $3_6$) or of its last effective portion (electrodes $3_1$-$3_4$) opposite to the connection structure 2.

In one or more of the detection sections there also extends at least one non-effective axial portion of at least one further electrode, namely, of an electrode other than (i.e., different from) the two measuring electrodes to which the two effective portions of the corresponding detection section belong. According to the type of embodiment of the level sensor, in one or more of the detection sections there can extend a number of non-effective portions of a number of further electrodes. For instance, from FIGS. 1-4 it will be appreciated that at the section S2 there extends one non-effective axial portion (not indicated) of the electrode $3_2$, whereas at the section S3 there extend two non-effective axial portions (not indicated) belonging to the electrodes $3_1$ and $3_3$. Likewise, at the section S4 there extend three non-effective axial portions (not indicated) belonging to the electrodes $3_1$, $3_2$, $3_4$, and at the section S5 there extend four non-effective axial portions (not indicated) belonging to the electrodes $3_1$, $3_2$, $3_3$, and $3_5$.

According to one aspect of the invention, the electrodes are shaped in such a way that, at one or more detection sections, the two effective axial portions of two corresponding measuring electrodes are closer to one another than they are to the non-effective axial portion or portions of one or more further electrodes that extend in the detection section considered. In various preferential embodiments, this particular configuration also enables definition of a detection structure in which the number of electrode axial portions in one detection section differs from the number of electrode axial portions in an adjacent detection section, with consequent advantages described hereinafter.

With reference to the example of FIGS. 1-4, the pairs of effective portions $EP_1$ and $EP_2$, $EP_1$ and $EP_3$, $EP_2$ and $EP_4$, $EP_3$ and $EP_5$, $EP_4$ and $EP_6$ of the sections S1-S5, respectively, extend to a prevalent extent, in the direction of length X, substantially parallel or equidistant, by a first predetermined distance, from one another. Conversely, at each of the sections S2-S5, each non-effective portion of the further electrode or electrodes present in the section considered extends to a prevalent extent in the length direction X at a second predetermined distance from the corresponding effective portions, with the second predetermined distances that are greater than the first predetermined distance. The aforesaid first distance and second distance are preferably understood as distances between the axes of the electrodes considered.

Figure 5:
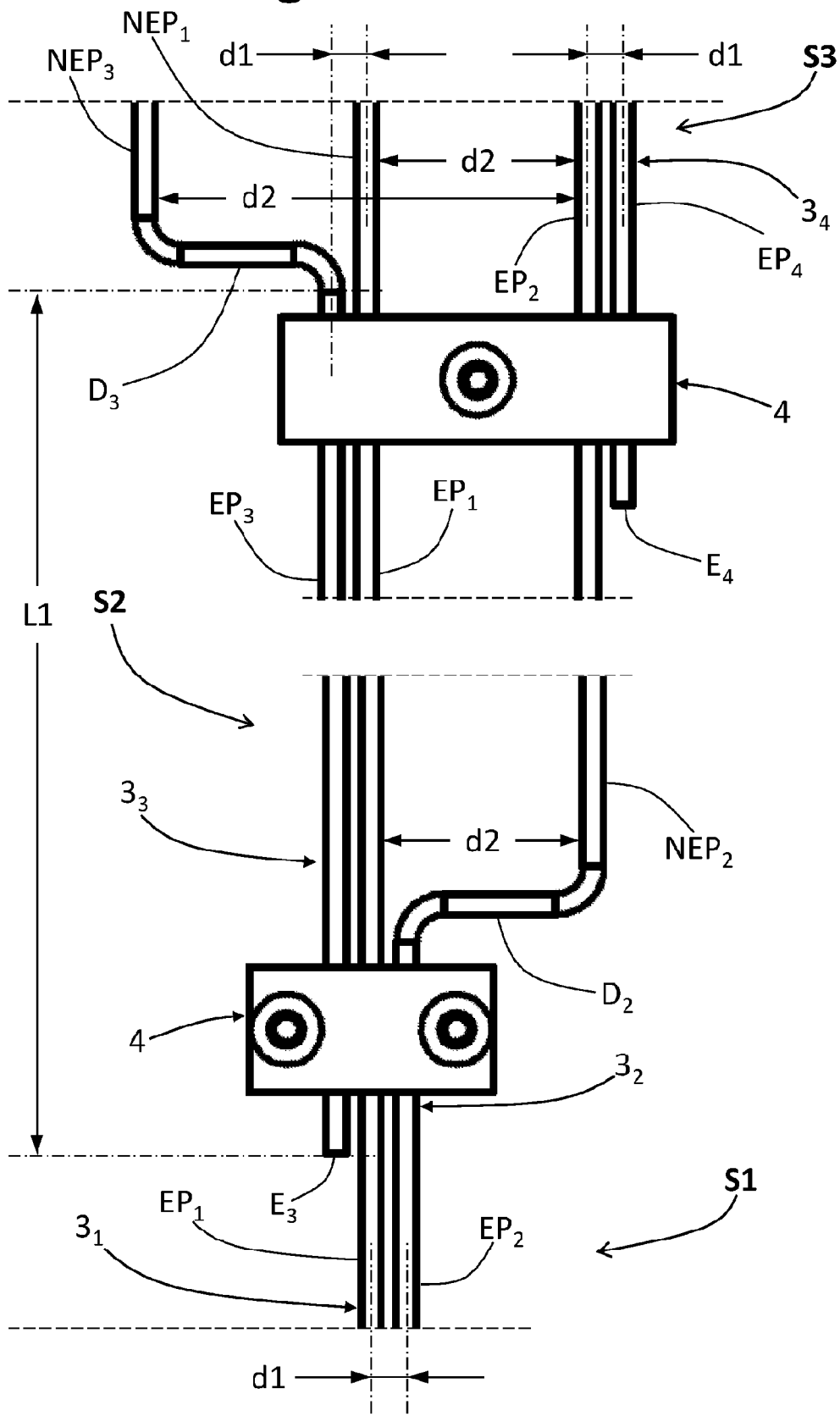
FIG. 5 is a schematic representation of a portion of a level sensor according to possible embodiments of the invention.

The concept is more clearly exemplified in FIG. 5, which illustrates partially the sections S1-S3 of the sensor LS of FIGS. 1-4. In FIG. 5, denoted by d1 is the aforesaid first distance, for example between the effective portions $EP_1$ and $EP_2$ of the electrodes $3_1$ and $3_2$ in the section S1, or between the effective portions $EP_1$ and $EP_3$ of the electrodes $3_1$ and $3_3$ in the section S2, or between the effective portions $EP_2$ and $EP_4$ of the electrodes $3_2$ and $3_4$ in the section S3.

Denoted, instead, by d2 are the second distances, between the effective portion $EP_1$ of the electrode $3_1$ and the corresponding non-effective portion (designated by $NEP_2$) of the electrode $3_2$ in the section S2, or else between the effective portion $EP_2$ of the electrode $3_2$ and the corresponding non-effective portions (designated by $NEP_1$ and $NEP_3$) of the electrodes $3_1$ and $3_3$ at the section S3 (it goes without saying that also the second distance d2 between the effective portion $EP_3$ of the electrode $3_3$ and the corresponding non-effective portion $NEP_2$ of the electrode $3_2$ at the section S2, or else between the effective portion $EP_4$ of the electrode $3_4$ and the corresponding non-effective portions $NEP_1$ and $NEP_3$ of the electrodes $3_1$ and $3_3$ at the section S3, are greater than the distance d1).

It should be noted that, even though it would be preferable, the distance d1 is not necessarily always the same at each detection section S1-S5, and the same may be said as regards the distances d2. In general terms, however, d2 is much greater than d1, for example from five to forty times greater, preferably from eight to twenty times.

In various embodiments, the aforesaid different distances d1, d2 between the effective portions and the non-effective portions of the various electrodes are obtained by envisaging at least one intermediate step in the electrodes themselves. In the example so far represented, the intermediate steps are designated by $D_2$-$D_5$ in FIGS. 1 and 4. It should be noted that, in the example, the electrode $3_1$ is substantially straight, i.e., without steps, whereas each of the electrodes $3_2$-$3_6$ defines along its development at least one intermediate step $D_2$-$D_5$, respectively. In various embodiments, the at least one intermediate step is configured in such a way that two consecutive portions of the corresponding electrode $3_2$-$3_6$ that are located upstream and downstream of the step itself extend substantially parallel to one another or according to axes parallel to one another in the direction of length X.

For this purpose, preferentially, the intermediate steps $D_2$-$D_5$ include a stretch of the corresponding electrode $3_2$-$3_6$ that extends substantially perpendicular to the aforesaid consecutive portions (see, for example, the horizontal stretches of electrode at which the lines of the reference numbers "$D_2$" and "$D_3$" in FIG. 5 terminate).

In general, one of the two aforesaid consecutive portions will be an effective portion of the electrode considered, whereas the other will be an non-effective portion of the same electrode.

As may be appreciated, the values of the distances d1 and d2 at the various detection sections S1-S5, basically depend upon the conformation of the intermediate steps of the electrodes concerned (in particular, upon the length of their stretches transverse or perpendicular to the direction X, possibly including curved radiusing stretches, which are visible in the figures provided by way of example).

In various embodiments, in order to ensure correct mutual positioning of the various electrodes at each detection section, the level sensor LS comprises a plurality of positioning elements, which are set at a distance from one another in the direction of length X and are configured for keeping the various electrodes permanently at the respective predetermined distances, such as the distances previously denoted by d1 and d2, and may possibly be used for fixing the electrodes in the operating conditions, for example within a container.

In various embodiments, the positioning elements are designed to define both a distance (d1) between portions of electrodes that are designed to make a detection and a distance (d2) between portions of electrodes that do not contribute to making a detection. Preferentially, the positioning elements are designed to define both a distance (d1) between at least two portions of electrodes of an effective portion and a distance (d2) between at least two portions of electrodes of a non-effective portion.

In the case of FIGS. 1-5, the aforesaid positioning elements are designated by 4 and may, for example, comprise two parts 4a and 4b (see FIG. 6) made of electrically insulating material that can be coupled together, for example by means of threaded members 4c or rivets or snap-action or mechanical-interference engagement elements, with respective stretches of the electrodes set in between. In what follows various other possible embodiments of the positioning elements 4 will be exemplified, which, where so required, can also be configured for the purposes of fixing in position a corresponding detection section 1 of the sensor LS inside a generic container, for example a tank.

In various preferential embodiments, where the distal ends of the various electrodes are at different heights, at least one of the two measuring electrodes that define the two effective portions of a corresponding detection section has its respective distal end in a position substantially corresponding or close to a positioning element of the type mentioned previously, or a little beyond it. Also the aforesaid preferential concept may be appreciated, for example, in FIGS. 1 and 4, where it may be noted how the distal ends $E_3$-$E_6$ of each of the electrodes $3_3$-$3_6$ project slightly beyond a corresponding positioning element 4. This is preferable for guaranteeing the precise positioning and/or proper fixing of the electrodes also in their lower terminal area.

In various preferential embodiments, at least one of the positioning elements 4 is set in the proximity of or in a position corresponding to at least one of the steps $D_2$-$D_5$, with the aforesaid positioning element that is configured for fixing the level sensor in position. Such a positioning of at least one such element 4 can enable fixing of the level sensor in a corresponding tank at areas of bending or variation of direction of the level sensor, corresponding to areas of variation of inclination of the tank.

The particular conformation of at least some of the electrodes (such as the electrodes $3_2$-$3_6$), as has been mentioned, preferably distinguished by the presence of at least one intermediate step (such as the steps $D_2$-$D_5$), and their relative positioning, together with the arrangement of the distal ends at different heights (such as the ends $E_3$-$E_6$), enables a detection structure 1 to be obtained in which the number of electrode portions in a given detection section differs from the number of electrode portions in a previous and/or subsequent detection section. In general, starting from the detection section closest to the connection structure 2, each successive detection section will include a number of electrode portions smaller by one than the previous section, however ensuring the presence in the aforesaid section of two effective portions. Also the aforesaid characteristic may be clearly appreciated from FIGS. 1, 2, and 4, where it may be noted how the sections S1, S2, S3, S4, and S5 each include six, five, four, three, and two electrode portions, respectively.

Figure 6:
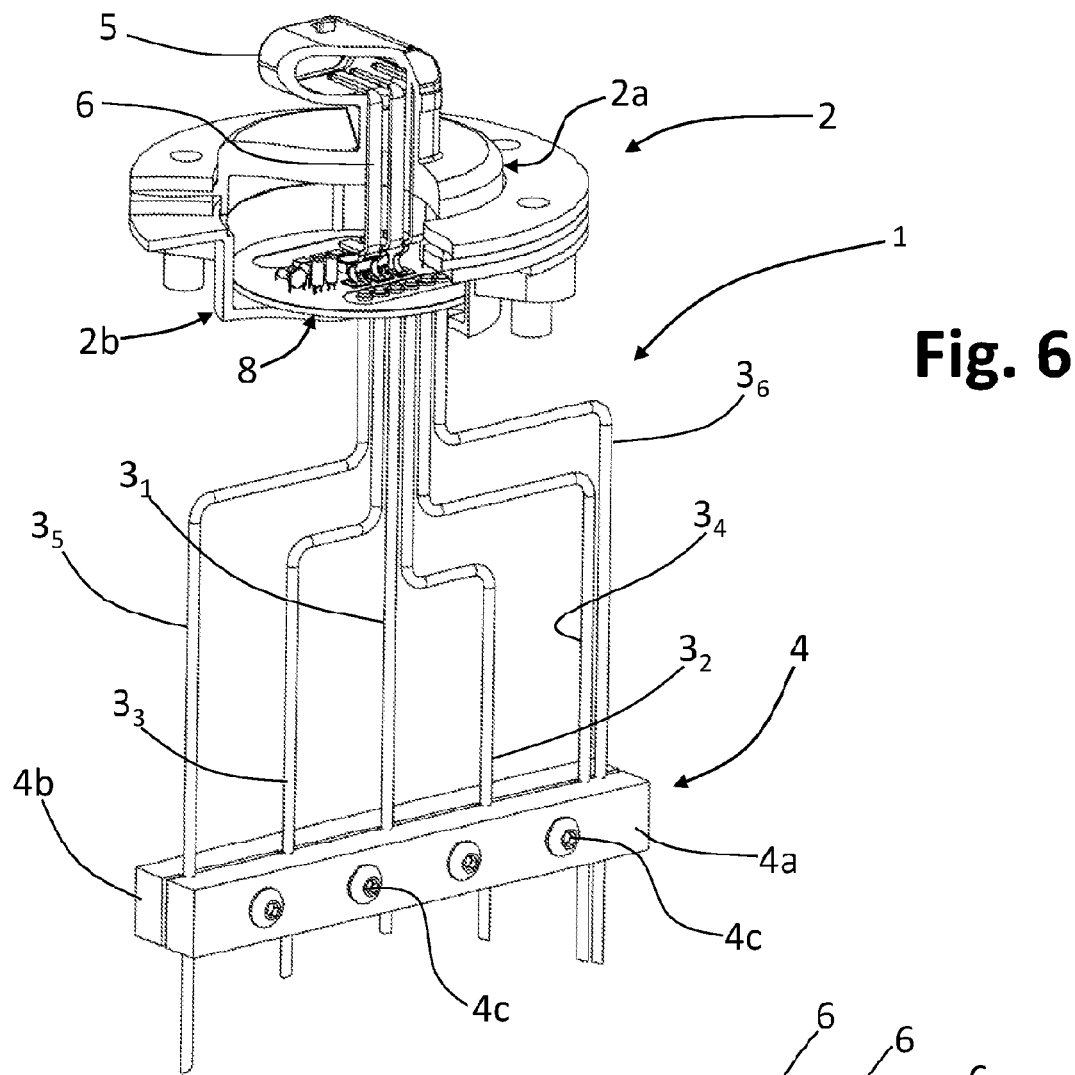
FIG. 6 is a partially sectioned schematic perspective view of a portion of a level sensor according to possible embodiments of the invention.
Figure 7:
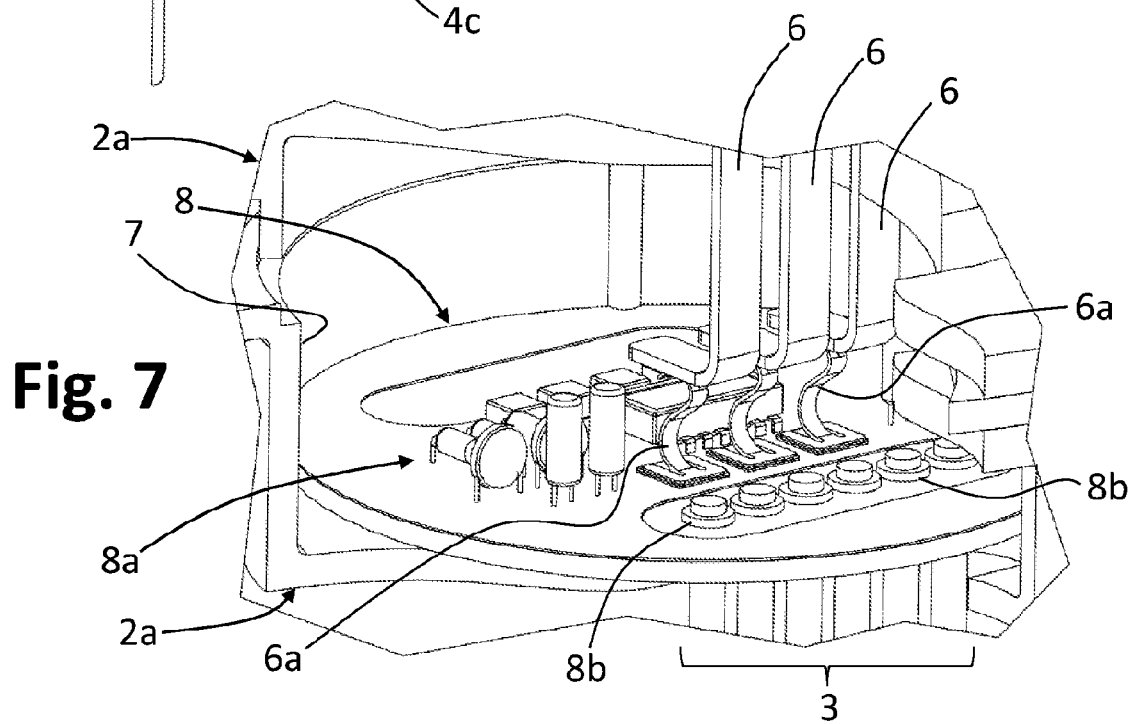
FIG. 7 is a detail of FIG. 6.
Figure 8:
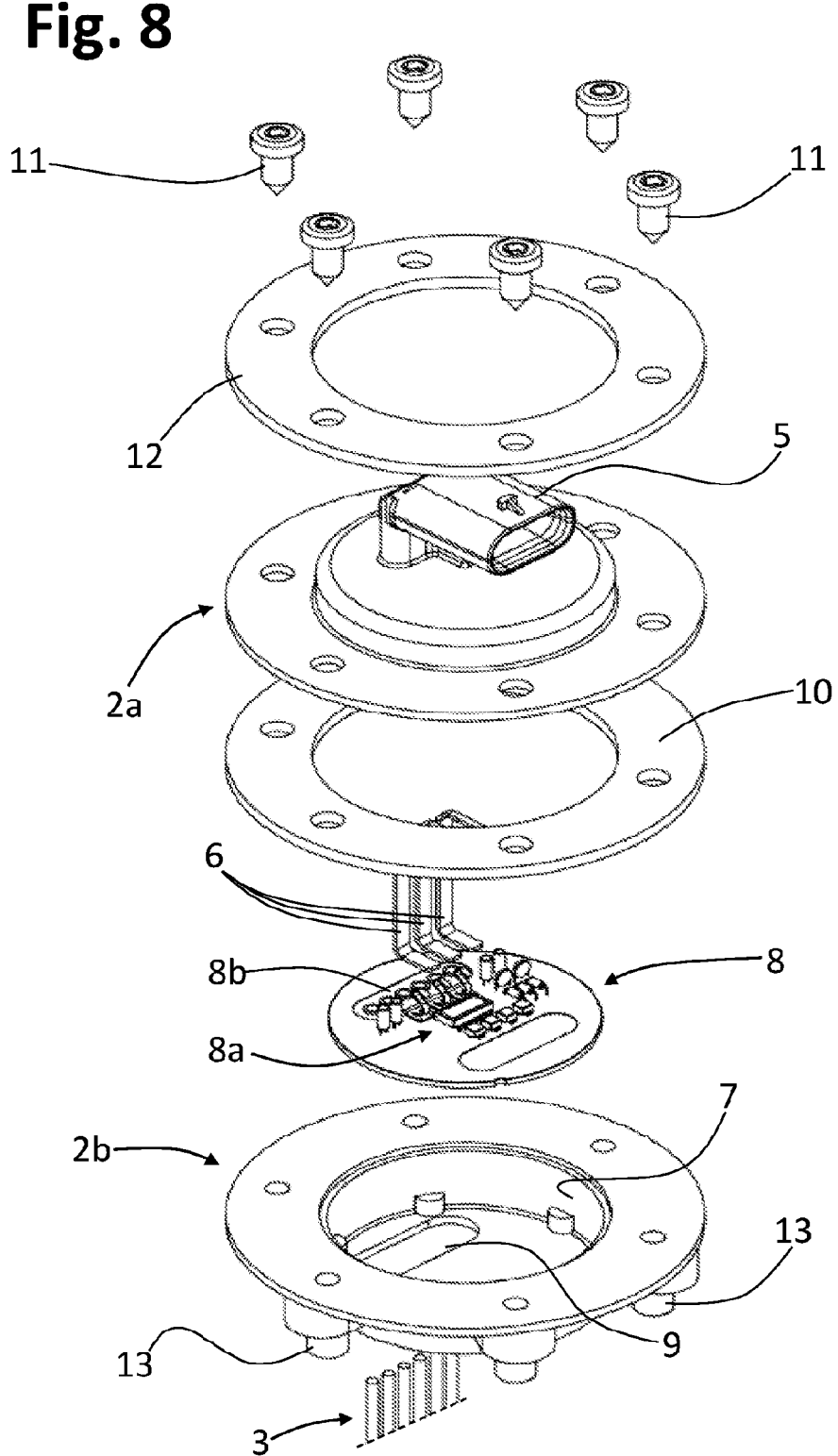
FIG. 8 is an exploded view of an electrical-connection structure of a level sensor according to possible embodiments of the invention.

FIGS. 6-8 illustrate a possible embodiment of a connection structure 2, which preferentially includes a respective casing, for example formed in two parts 2a and 2b, preferably made of electrically insulating material. In various embodiments, a part of the casing, such as the upper part 2a, defines a connector body 5, within which electrical connection terminals 6 partially extend, for interfacing the level sensor LS to an external system.

In various embodiments, the aforesaid casing is shaped for housing inside it a processing and/or control circuit, to which the electrodes of the detection structure 1 are electrically connected, preferably at their proximal ends. In the case exemplified, the two casing parts 2a and 2b are shaped to define a chamber 7 between them for housing a circuit support 8, on which there may be mounted the circuit components 8a for control of the level sensor, preferably including an electronic control unit, such as a microcontroller with associated non-volatile memory means, in which the program for control of the sensor resides.

The electronic unit or processing and/or control circuit 2 preferably comprises at least one from among an oscillator circuit or a circuit designed to generate a frequency signal, a circuit designed to detect an impedance and/or a capacitance and/or an electrical resistance, an amplifier circuit, a controllable switch or a multiplexer or a circuit for switching the inputs and/or electrodes, a signal-sampling or sample-and-hold circuit, an analog-to-digital converter, a data-processing circuit, a memory circuit, a data-transmission circuit, preferably for transmission and/or reception in a serial format, very preferably by way of a SENT (Single-Edge Nibble Transmission) interface and/or protocol.

In the case of use of a microcontroller, this preferably comprises at least one processing and/or control logic unit, a memory circuit and inputs and outputs, amongst which inputs of an analog/digital type. As an alternative to the electronic control unit, it could comprise an integrated circuit of an ASIC or FPGA type and an integrated circuit dedicated to performing the functions of analog-to-digital converter.

The circuit support 8 is preferably provided with a connection arrangement 8b for the electrodes $3_1$-$3_6$, which is connected to the circuit provided by the aforesaid componentry 8a, and moreover connected to the aforesaid circuit are the terminals 6, for example via spring contacts 6a. One of the two parts of the casing, here the part 2b, is preferably provided with a passage 9 for the proximal end portions of the electrodes, and to this passage 9 there can be associated suitable sealing means, such as a resin-bonding. Also between the two casing parts 2a, 2b there are preferentially provided sealing means 10 (FIG. 8), such as an annular gasket. The two casing parts 2a, 2b are fixed together, with the sealing means 10 set in between, for example via threaded members or else with snap-action engagement means or technically equivalent means; in the example illustrated, provided for the purpose are threaded members and an upper fixing ring, designated by 11 and 12, respectively, in FIG. 8. Preferentially, at least one of the parts of the casing, here the part 2b, is provided with elements 13 for positioning and/or fixing the connection structure 2 to a different structure, for example to the outside of a tank.

In various embodiments, the control circuit of the level sensor is configured for selectively applying an electrical potential difference, preferably frequency-modulated, between the two measuring electrodes that define the two detection axial portions of a corresponding detection section, and for detecting the value of a given electrical quantity between the aforesaid two detection axial portions, this electrical quantity being representative of the level of the liquid. As seen above, the various electrodes are set electrically insulated from each other, i.e., in the absence of a permanent electrical connection between two or more electrodes, and therefore in the absence of electrical connections in series or in parallel. The control circuit is nevertheless preferably configured for connecting to ground the electrodes other than the two measuring electrodes to which the aforesaid difference of potential is applied from time to time.

The electrical quantity of interest is therefore detected substantially only between the two detection axial portions of the section which is considered from time to time, these detection portions extending to a prevalent extent only in the direction of level detection, and hence without the use of interdigitated conductive elements that extend transversally to the two electrodes, as typically happens in various capacitive sensors according to the prior art.

According to the type of sensor configuration and of the characteristics of the liquid the level of which is to be detected, the electrical quantity in question may be an impedance or a resistance or a capacitance, and the control circuit will be configured accordingly. For instance, in the case where the electrodes of the sensor are directly in contact with the liquid, the electrical quantity measured between the electrodes may be the capacitance, when the liquid is relatively insulating or has a low conductivity (such as diesel or new/non-spent oil), or else the impedance in the case of more conductive liquids (such as urea/AD-Blue, non-deionised water, windscreen-washer liquids, used/spent oil, etc.).

The capacitance could be measured also in the case of a sensor LS the electrodes of which are electrically insulated with respect to the liquid, for example enclosed in a coating of electrically insulating material substantially impermeable to the liquid, and the liquid is electrically conductive (for example, a water-urea solution). It will appear clear to the person skilled in the art that, at least in the cases where the electrodes are in contact with the liquid, the result of the measurement of capacitance will also depend upon the dielectric constant of the liquid itself, it being possible also to detect a value of impedance or a value of resistance or conductivity of the liquid.

Figure 9:
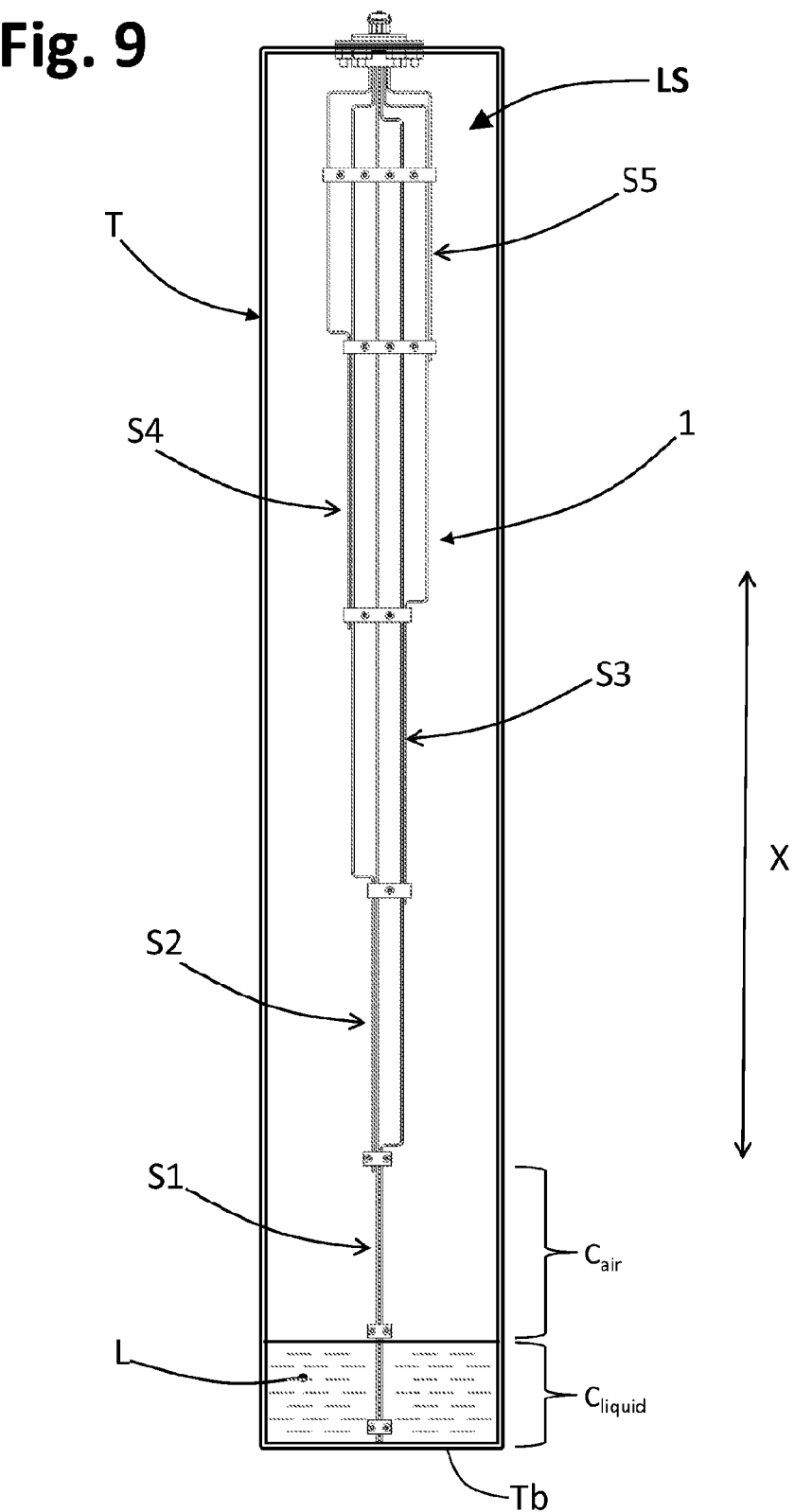
FIGS. 9-11 are schematic representations aimed at exemplifying operation of a level sensor according to possible embodiments of the invention.

FIG. 9 is a schematic illustration of a sensor LS of the type described previously, mounted inside a generic container T, for example the tank of a vehicle. In the example, the sensor LS is set in such a way that its section S1 is the one furthest down in the direction of length X. Obviously, in other embodiments, the sensor LS could be set upside down with respect to the case illustrated (i.e., with the section S5 furthest down), possibly adapted for this purpose, and in this case the control logic of the sensor itself could be substantially reversed with respect to the one exemplified hereinafter.

In the case of FIG. 9, present in the container T is a relatively small amount of liquid L, in which the detection section S1 is only partially immersed.

Assume that the liquid in question is diesel and that the electrical quantity measured between the effective portions of the electrodes is the capacitance. In the example considered, the electrodes $3_1$-$3_6$ constitute capacitive electrodes: consequently, when the two effective portions of a certain detection section are immersed at least partially in a liquid, the value of capacitance that can be detected between the two corresponding electrodes will be different from the one that can be detected in the absence of liquid (i.e., in the case where the electrodes are not immersed), this value of capacitance depending upon the dielectric constant of the liquid in question.

In the course of a step of level measurement, the control circuit of the sensor will initially control application of the difference of potential or of the frequency-variable signal between just the electrodes $3_1$ and $3_2$, the effective portions $EP_1$ and $EP_2$ of which provide the detection section S1. As has been mentioned, the remaining electrodes $3_3$-$3_6$ may be connected to ground (or to a different electrical potential or not connected to a potential). More in general, the step of measurement will start from the detection section that is located furthest down inside a container the level of liquid of which is to be measured; however, nothing in principle rules out starting detection with a different sequence, for example starting from the section furthest up (such as the section S5, in the example discussed so far).

Given constant application of the potential difference, the control circuit measures a value of capacitance between the two electrodes $3_1$ and $3_2$, which will be variable as a function the degree of immersion of the two effective portions $EP_1$ and $EP_2$ in the liquid L; the circuit then compares the value detected with corresponding reference information contained in suitable non-volatile memory means of the circuit itself, the aforesaid information representing, for each value or range of values of capacitance detected for the given section S1, the corresponding level of liquid L.

The aforesaid reference information is obviously obtained previously, in the design stage, following upon experimental tests conducted using a level sensor LS on a container T, with various levels of the liquid L, and preferably also following upon settings or calibrations in the production stage.

Basically then, following upon the measurement and comparison made, the control circuit is able to know to what extent the effective portions $EP_1$ and $EP_2$ of the section S1 are immersed in the liquid L or, conversely, to what extent the aforesaid portions $EP_1$ and $EP_2$ are not immersed or are in air (or some other gas), and thereby know the corresponding level of the liquid. The control circuit, preferably implemented in the connection structure 2, will then transmit or generate signals towards the outside world, for example via the electrical connector 5-6 described previously, these signals representing the level information.

As has been mentioned, according to the characteristics of the liquid and the type of configuration of the sensor (electrodes isolated from the fluid or not), the corresponding control circuit may be configured for detecting a value of impedance between the electrodes, instead of capacitance, and make the necessary comparisons with corresponding reference information.

As mentioned previously, in various preferential embodiments, the various sections S1-S5 have a decreasing number of electrode portions, starting from the section closest to the structure 2. This characteristic is advantageous for improving the quality of level detection.

In this regard, it is to be considered in general that, when electrodes set side by side are only partially immersed in a liquid, the capacitance of the (overlying) stretches of electrode in air, i.e., the stretches not immersed in the liquid, gives rise to an electrical noise or to a parasitic capacitance, which vitiates to a certain extent the measurement with respect to the capacitance of the aforesaid immersed stretches. This noise or parasitic capacitance has a major effect when the level of the liquid is low, i.e., when the capacitance in the liquid is clearly lower than the capacitance in air. With reference, for example, to the case of FIG. 9, designated by as a whole by $C_{liquid}$ is the capacitance between the immersed stretches of the electrodes E1 and E2, whereas designated by $C_{air}$ is the capacitance between their stretches in air.

Thanks to the particular configuration with a decreasing number of the electrode portions between the various sections S1-S5, also in the case of a low level of the liquid L, the capacitance in air $C_{air}$ will be determined by just the non-immersed stretches of the electrode portions of the section S1 present in the liquid. Thanks to the fact that the detection section S1 consists of just two adjacent electrode portions (i.e., the effective portions $EP_1$ and $EP_2$ of the electrodes $3_1$ and $3_2$ see FIG. 5) the other electrodes of the structure 1 will substantially not give rise to any noise or parasitic capacitance at the aforesaid section S1, or in any case will give rise to very low electrical noise or parasitic capacitances, thereby rendering the level detection more precise.

Instead, if the distal ends of the electrodes $3_1$-$3_6$ were all to be located substantially at, or in the proximity of, the bottom wall Tb of the container T, the section S1 (or, more in general, each detection section S1-S5), would include in addition to the respective two effective electrode portions also further four non-effective portions of the other electrodes. In such a hypothetical case, in the presence of a level of liquid L equal, for example, to the one illustrated in FIG. 9, in addition to the immersed and non-immersed stretches of the effective portions of the electrodes $3_1$ and $3_2$, at the section S1 there would also be other four immersed stretches and as many non-immersed stretches of corresponding non-effective portions of the electrodes $3_3$-$3_6$, with consequent, much more marked electrical noise and parasitic capacitances, to the detriment of the quality of level measurement.

It should be noted that, with a configuration of the type illustrated in FIG. 5, a terminal stretch of the electrode $3_3$, i.e., of its effective portion $EP_3$, is set alongside the effective portion $EP_1$ of the electrode $3_1$ also at the section S1: this stretch set alongside is in any case of limited length in such a way that the disturbance introduced thereby is very low.

Figure 10:
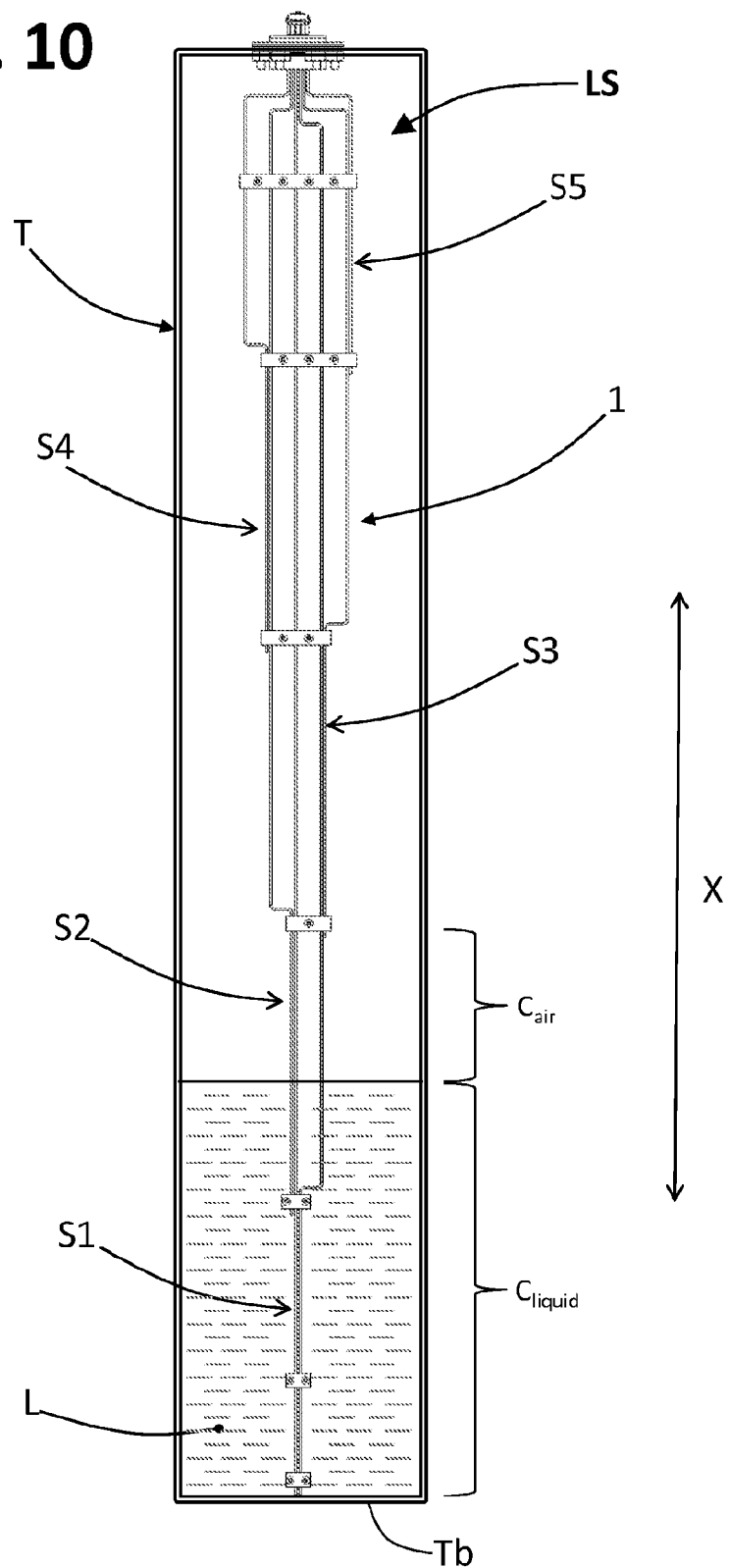

FIG. 10 illustrates, instead, the case where the amount of liquid L in the container T is such that the level can be detected by the section S2. In such a situation, for example, the level-detection step will envisage the steps already explained above in relation to the section S1, i.e., application of the potential difference between the electrodes $3_1$ and $3_2$, subsequent detection of the capacitance between the same electrodes, and comparison of the value detected with the reference information. The control circuit, in addition to recognising that the section S1 is completely immersed in the liquid, will then repeat of the same steps in relation to the overlying section S2, and hence:

application of the potential difference between just the electrodes $3_1$ and $3_3$, the effective portions $EP_1$ and $EP_3$ of which constitute the detection section S2, with possible connection to ground of the remaining electrodes $3_2$ and $3_4$-$3_6$, measurement, with constant application of the potential difference, of the value of capacitance or impedance between the two electrodes $3_1$ and $3_3$, which is variable as a function of the degree of immersion in the liquid L of the two effective portions $EP_1$ and $EP_3$;

comparison of the value detected with the corresponding reference information in order to deduce the corresponding level of liquid L; and transmission of the signal representing the level detected to the outside world.

The same logic will be followed in succession for all the other sections further up, according to the level of the liquid L in the container T. On the other hand, nothing in principle rules out starting the detection step from the uppermost section within the container T.

In the situation of FIG. 10, at the section S2, both the effective portions $EP_1$ and $EP_3$ of the electrodes $3_1$ and $3_3$ and the non-effective portion $NEP_2$ of the electrode $3_2$ are partially immersed in the liquid L (see FIG. 5). As explained previously, according to the invention, the non-effective portion $NEP_2$ is located at distances d2 from the effective portions $EP_1$ and $EP_3$ greater than the distance d1 between the effective portions $EP_1$ and $EP_3$: in this way, the effect of electrical disturbance or parasitic capacitance generated by the electrode $3_2$ at the section S2 is negligible, or in any case very limited, to the advantage of precision of level detection.

Figure 11:
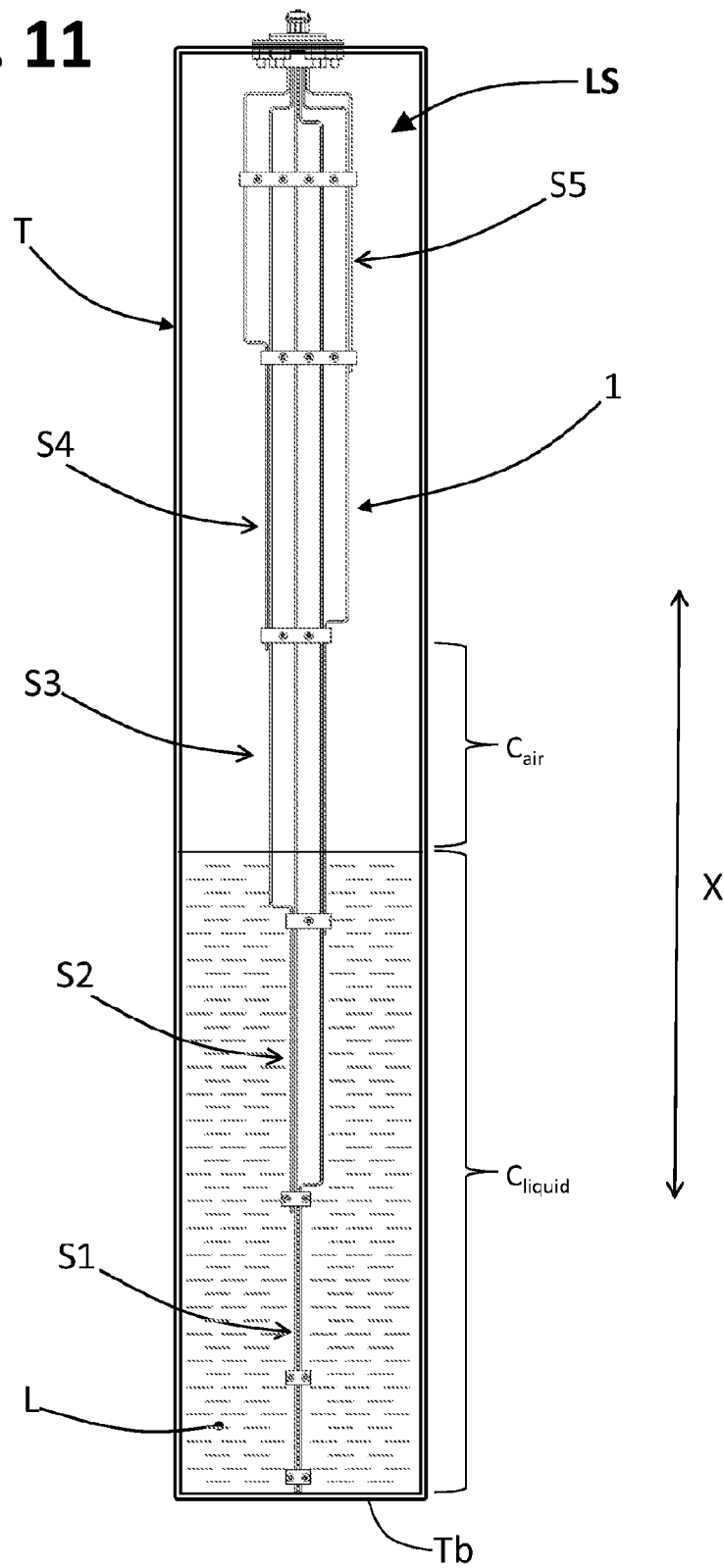

FIG. 11 illustrates the case where the amount of liquid L in the container T is such that the level can be detected by the section S3. The detection logic remains the one described above, with the control circuit that, in addition to recognising that the sections S1 and S2 are completely immersed in the liquid, will repeat the steps mentioned above in relation to the overlying section S3.

In the situation of FIG. 11, at the section S3, both the effective portions $EP_2$ and $EP_4$ of the electrodes $3_2$ and $3_4$ and the non-effective portions $NEP_1$ and $NEP_3$ of the electrodes $3_1$ and $3_3$ are partially immersed in the liquid L (see FIG. 5). According to the invention, the aforesaid non-effective portions $NEP_1$ and $NEP_3$ are located at distances d2 greater than the distance d1 between the effective portions $EP_2$ and $EP_4$, in this way minimising the effect of electrical disturbance or parasitic capacitance generated by the electrodes $3_1$ and $3_2$ at the section S3, to the advantage of precision of level detection.

Figure 12:
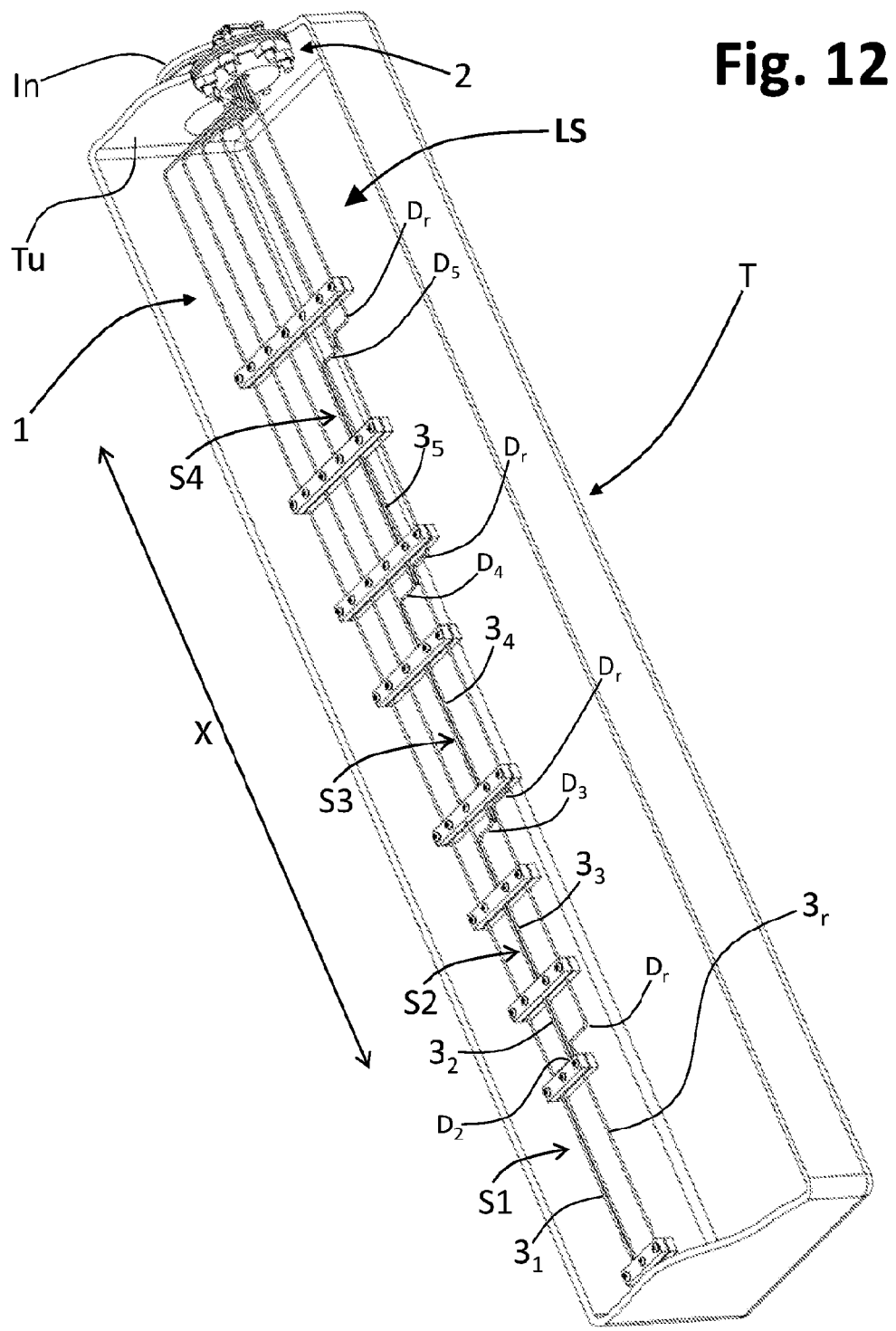
FIG. 12 is a partially sectioned schematic perspective view of a generic container, mounted in which is a level sensor according to possible embodiments of the invention.
Figure 13:
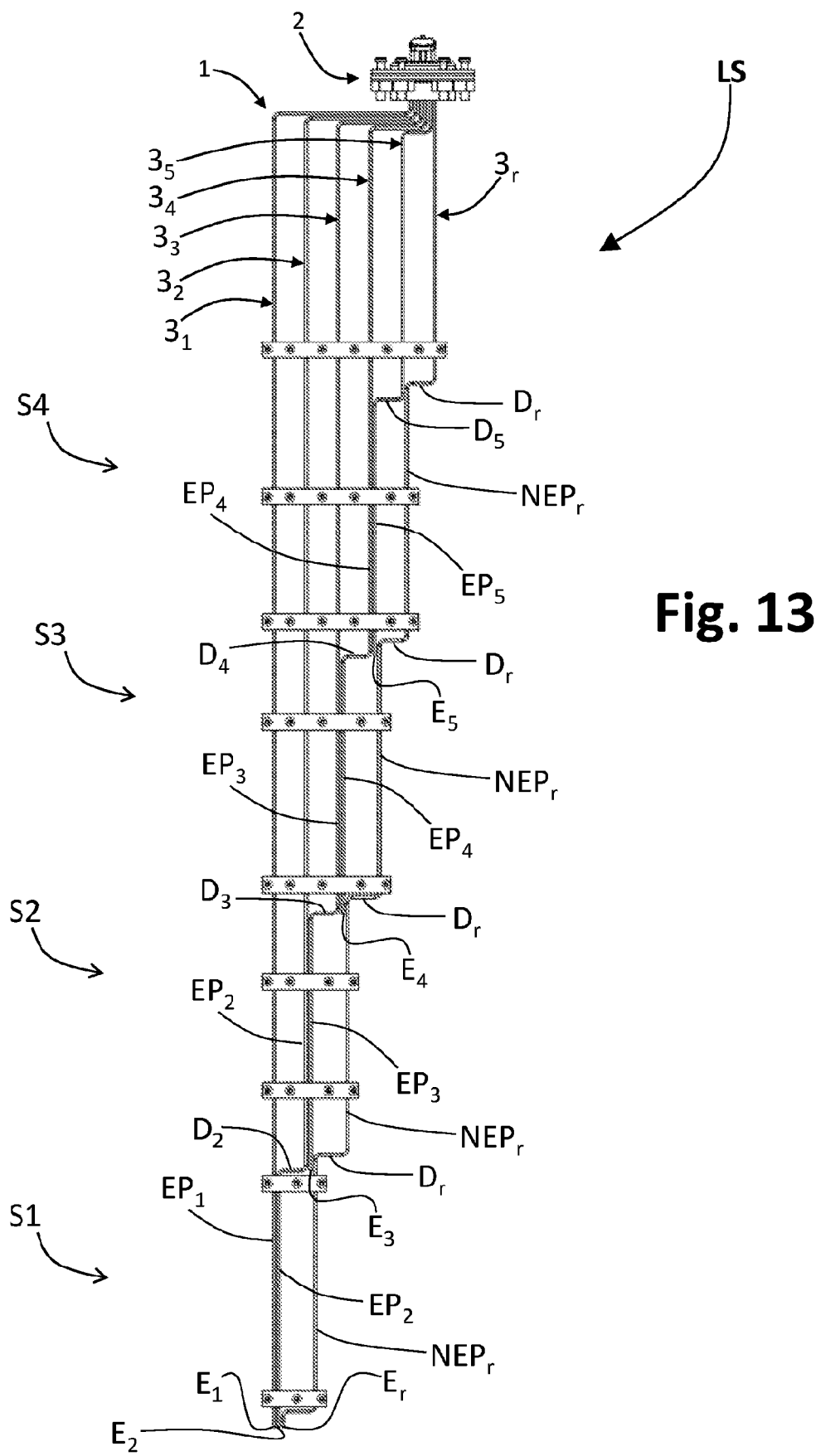
FIG. 13 is a front elevation of the level sensor of FIG. 12.

Illustrated in FIG. 12 is a level sensor LS according to further possible embodiments of the invention, mounted within a generic container T of a liquid, for example a tank. In FIG. 13, the sensor LS itself is illustrated in isolation, in front elevation.

From the aforesaid FIGS. 12-13, it may be noted how, unlike what is illustrated in the previous FIGS. 1-11, the steps $D_2$-$D_5$ of the electrodes $3_2$-$3_5$ can be all defined at one and the same side of the detection structure 1 (here the right-hand side, as viewed FIG. 11).

FIGS. 12 and 13 likewise illustrate how, in various embodiments, the plurality of electrodes that make up a detection structure 1 may comprise at least one calibration or reference electrode.

In various embodiments, the sensor forming the subject of the invention is configured for detecting the level of liquids that might be non-homogeneous and stratified both in terms of composition and in terms of temperature. For a more accurate measurement it is hence possible, in various preferential embodiments, to provide a calibration element at a number of detection sections of one and the same detection structure, in particular at least one calibration element at each pair of effective portions of electrode.

Advantageously, the various calibration elements may be defined by a single calibration or reference electrode. Preferentially, the aforesaid single calibration electrode is shaped for defining a plurality of calibration portions, each of which is locally set alongside, preferably substantially parallel to, one of the effective portions of a corresponding detection section. The calibration portions are preferentially positioned in the lowest part of the corresponding detection section so that they can also be used when the liquid laps only a small portion of the effective portions of the corresponding measuring electrodes.

In the particular case exemplified in FIGS. 12 and 13, there are provided five measuring electrodes, designated by $3_1$-$3_5$, and a single calibration electrode designated by $3_r$. The measuring electrodes, i.e., the respective active portions $EP_1$-$EP_5$, in this case define four detection sections S1-S4. As it can be seen, therefore, also in this example the number of the detection sections S1-S4 is smaller than the number of the electrodes $3_1$-$3_5$, $3_r$.

The calibration electrode $3_r$ is shaped, in particular via a plurality of respective intermediate steps $D_r$, so as to define a plurality of calibration portions, each of which as has been mentioned extends substantially parallel to the two effective portions of the two measuring electrodes of a corresponding detection section S1-S4. The steps $D_r$ are preferably configured in such a way that the calibration portion of the electrode $3_r$ will be parallel to the effective portions of the two measuring electrodes only for a limited stretch.

It should be noted that, thanks to the conformation referred to above, with the steps $D_2$-$D_5$ and $D_r$ of the measuring electrodes and of the calibration electrode, respectively, all of which are defined at one and the same side of the detection structure 1, each measuring electrode $3_1$-$3_5$ defines just one respective effective portion $EP_1$-$EP_5$.

In various embodiments, such as the one exemplified, the steps $D_r$ are in a staggered position with respect to the steps $D_1$-$D_5$.

Figure 14:
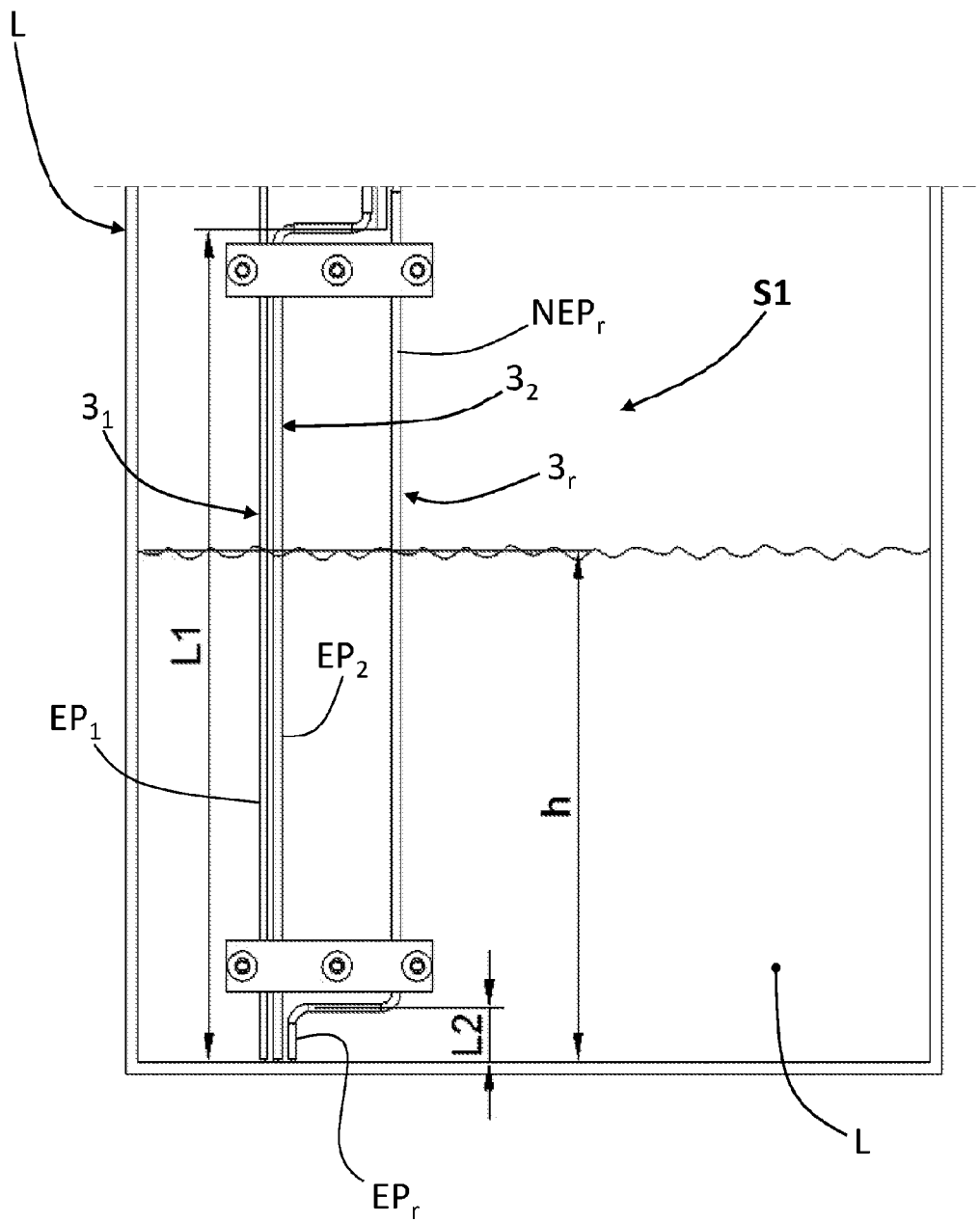
FIGS. 14a, 14b, and 14c are schematic representations of portions of a level sensor according to possible embodiments of the invention.
Figure 14:
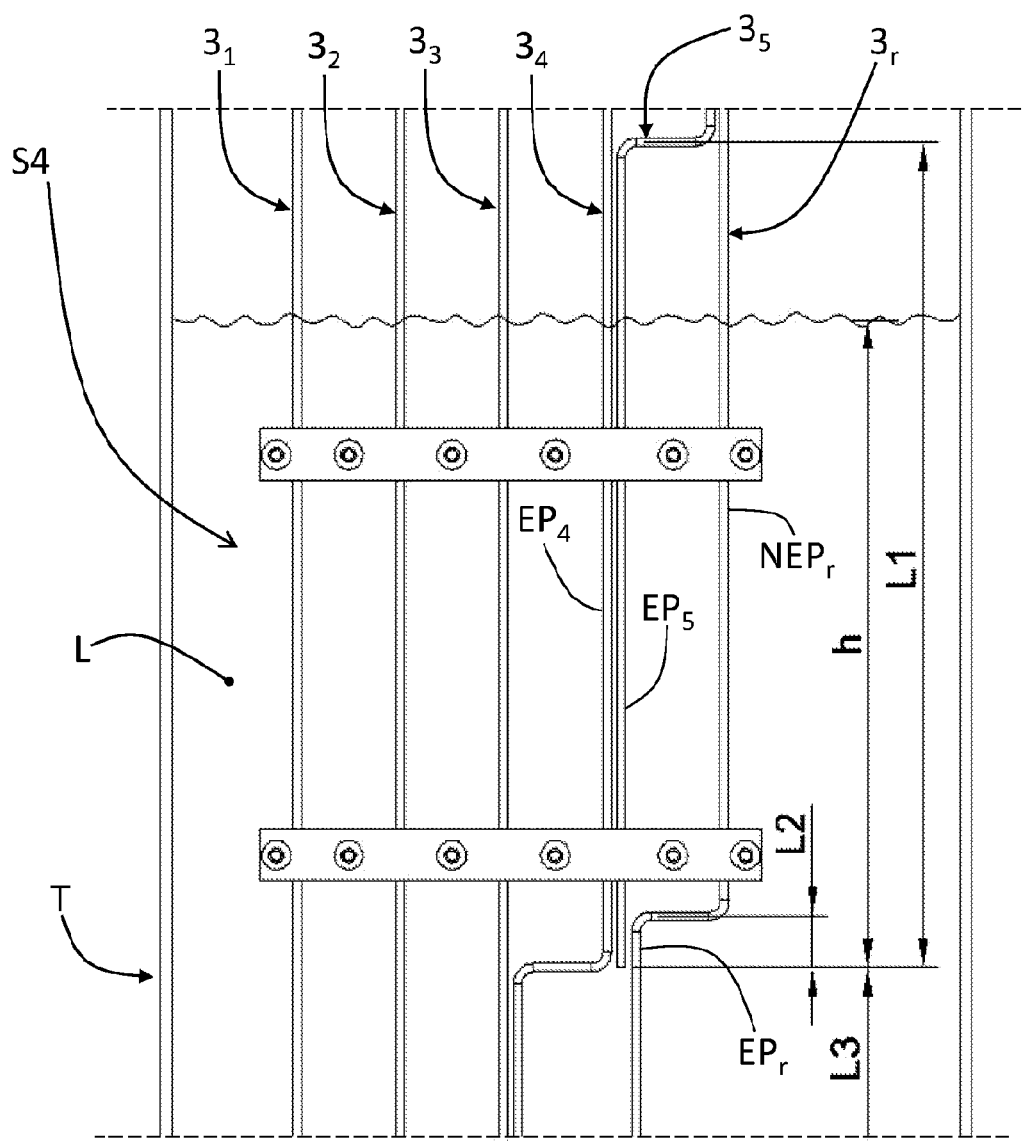

With reference to part (a) of FIG. 14, designated by $EP_r$ are two of the aforementioned calibration portions of the electrode $3_r$, which extend in the direction of length substantially parallel to the effective portions $EP_1$ and $EP_3$ of the section S1, and to the effective portions $EP_2$ and $EP_3$ of the section S2, respectively. The calibration portions $EP_r$ extend at respective third predetermined distances d3 between their own axes and the axes of the two effective portions of the corresponding detection sections, the aforesaid third distances d3 being shorter than the second predetermined distances d2 referred to previously.

Once again in part (a) of FIG. 14, denoted by $NEP_r$ are portions of the calibration electrode $3_r$ that extend between an aforesaid calibration portion $EP_r$ and a corresponding step $D_r$. As may be noted, for each detection section, these portions $NEP_r$ extend at a distance $d2_r$ from the two effective portions of the corresponding detection sections that is greater than the corresponding distances d1, and preferably also greater than the distances d3. In part (a) of FIG. 14 denoted by $d2_r$ is the distance between a portion $NEP_r$ and just one ($EP_2$ and $EP_3$) of the two effective portions of the sections S1 and S2: it will be appreciated, however, that also the distance $d2_r$ between each portion $NEP_r$ and the other ($EP_1$ and $EP_2$) of the two effective portions of the sections S1 and S2 is greater than the corresponding distances d1.

It will be appreciated that the values of the distances d1, d2, d3, and $d2_r$, at the various detection sections depend upon the conformation assigned to the intermediate steps of the electrodes concerned.

Preferentially, at each detection section, the calibration portion $EP_r$ of the calibration electrode $3_r$ has a length that is smaller than the length of the two corresponding effective portions of the two measuring electrodes. Also this characteristic may be clearly appreciated in part (a) of FIG. 14, where denoted by L1 is the length in the direction of length of the effective portions of the measuring electrodes, whereas denoted by L2 is the length in the same direction—of the calibration portions of the calibration electrode. The length of the calibration portions defined by the calibration electrode is in general smaller than the length of the corresponding effective portions of the measuring electrodes: in general, for effective portions that have a length comprised between 10 and 150 cm, preferably between 5 and 40 cm, the corresponding calibration portions of the calibration electrode will have a length comprised between 0.2 and 10 cm, preferably between 0.5 and 4 cm.

On the basis of what has already been described above, by virtue of the distances $d2_r$, the effect of electrical disturbance or parasitic capacitance generated by the portions $NEP_r$ of the calibration electrode $3_r$ at the various detection sections will be negligible, or in any case very limited, to the advantage of precision of level detection. On the other hand, considering their small length L2 in proportion to the length L1, the electrical noise generated by the calibration portions $EP_r$ will be very low.

It will be appreciated that the contribution to the capacitance (or other electrical quantity) detected between a pair of measuring electrodes is due practically entirely to the respective effective portions of length L1 (see once again part (a) of FIG. 14): subsequently, the distance between the two measuring electrodes becomes much greater, and the contribution to the capacitance becomes negligible.

The calibration process is preferably carried out at the end of the production line, i.e., after the sensor LS has been manufactured, in order to obtain one or more coefficients of correction or compensation of the electrical quantity that represents the level of the liquid (capacitance, or impedance, or resistance).

For instance, assuming that operation of the sensor is based upon detection of a capacitance between the effective portions of the measuring electrodes $3_1$-$3_5$, it will be possible to operate by measuring the capacitance in air, i.e., with the electrodes not immersed, at at least two different temperatures T1 and T2, between the calibration electrode $3_r$ (i.e., its portions $EP_r$) and the various measuring electrodes $3_1$-$3_5$ (i.e., their portions $EP_1$-$EP_5$), as well as between the various measuring electrodes $3_1$-$3_5$ (i.e., between their portions $EP_1$-$EP_5$). For the purposes of these reference detections, the sensor may be put in a climatic chamber first at the temperature T1 and then at the temperature T2. Possibly, similar detection sequences may be carried out also with the sensor LS immersed in a liquid with known physical characteristics.

Consequently, with reference, for example, to the lower part of FIG. 14 (a), at the temperature T1, at the section S1, between the calibration portion $EP_r$ of the reference electrode $3_r$ and the corresponding fraction set alongside it of the effective portion $EP_2$ of the measuring electrode $E_2$, the capacitance $C_{air\ Ref\ S1}$ will be detected, and between the effective portions $EP_1$ and $EP_2$ of the measuring electrodes $E_1$ and $E_2$, a capacitance $C_{air\ Eff\ S1}$ will be detected. The values of capacitance $C_{air\ Ref\ S1}$ and $C_{air\ Eff\ S1}$ detected for the section S1 will then be written in the memory of the control circuit of the sensor.

Next, with reference to the upper part of FIG. 14 (a), once again at the temperature T1, in the section S2, between the calibration portion $EP_r$ of the reference electrode $3_r$ and the corresponding fraction set alongside it of the effective portion $EP_3$ of the measuring electrode $E_3$, the capacitance $C_{air\ Ref\ S2}$ will be detected, and between the effective portions $EP_2$ and $EP_3$ of the measuring electrodes $E_2$ and $E_3$, a capacitance $C_{air\ Eff\ S2}$ will be detected. Also the values of capacitance $C_{air\ Ref\ S2}$ and $C_{air\ Eff\ S2}$ detected for the section S2 will then be written in the memory of the control circuit of the sensor.

The detections of the capacitances $C_{air\ Ref\ S(n)}$ and $C_{air\ Eff\ S\ (n)}$ and corresponding storage thereof in the memory are then made for the remaining overlying sections $S_3$ and $S_4$, always at the temperature T1. The same process will be repeated at a second ambient temperature T2 for all the sections.

As has been mentioned, it is also possible to carry out a sequence of detections and storage of the detected values also with the sensor immersed in a known liquid, in order to obtain corresponding values of capacitance $C_{liquid\ Ref\ S(n)}$ and $C_{liquid\ Eff\ S(n)}$.

Detection of the capacitances $C_{air\ Ref\ S(n)}$ and $C_{air\ Eff\ S\ (n)}$ (and possibly of the capacitances $C_{liquid\ Ref\ S(n)}$ and $C_{liquid\ Eff\ S(n)}$, when envisaged) enables the control circuit, pre-arranged for the purpose, to determine the coefficients of compensation or correction $a_{(n)}$ and $b_{(n)}$ to be employed during actual use of the device.

Correction or compensation during effective use of the sensor LS is carried out on the basis of the aforesaid coefficients $a_{(n)}$ and $b_{(n)}$, for example in the way described in what follows (once again assuming that the quantity detected is the capacitance).

With reference, for example, to part (b) of FIG. 14, when the container T is filled with liquid up to a level h, only the measuring electrodes $3_1$ and $3_2$, apart from the calibration electrode $3_r$, are in contact with the liquid itself. The length of the stretch of the effective portions $EP_1$ and $EP_2$ of the measuring electrodes $3_1$ and $3_2$ in air is equal to L1-$h$, whereas the length immersed in the liquid is equal to h.

The control circuit of the sensor LS is pre-arranged for measuring a capacitance $C_{m\ S1}$ between the effective portions $EP_1$ and $EP_2$ of the aforesaid measuring electrodes, and a capacitance $C_{Ref\ S1}$ between the corresponding effective portion $EP_r$ of the calibration electrode $3_r$, having a height L2, and the corresponding stretch of the effective portion $EP_2$ of the measuring electrode $3_2$ at the section S1.

Given that the effective portions $EP_1$ and $EP_2$ of the measuring electrodes considered are in part immersed in the liquid and in part in air, the capacitance $C_{m\ S1}$ has a contribution due to the part in air and a contribution due to the liquid:

$$C_{m\ S1} = C_{air\ Ref\ S1}(L1-h)/L1 \cdot a1 + C_{Ref\ S1} \cdot h/L2 \cdot b1$$

The parameters a1 and b1 are the corrective coefficients for the section S1 mentioned previously, determined during calibration, as likewise the value of $C_{air\ Ref\ S1}$.

From the foregoing equation it is thus possible to obtain the value of interest h, i.e., of the level:

$$h = (C_{m\ S1} - C_{air\ Ref\ S1} \cdot a1) \cdot (b1/L2 \cdot C_{Ref\ S1} - a1/L1 \cdot C_{air\ Ref\ S1})^{-1}$$

The expression of $C_{m\ S(n)}$ can be obtained by assuming two contributions to the capacitance: one due to the liquid ($C_{Ref\ S1} \cdot h/L2$) and one due to the air ($C_{Ref\ S1} \cdot h/L2 \cdot b1$)

These two terms are obtained by taking the capacitance per length unit and multiplying it by the length of the stretch of the effective portions of the electrodes concerned by the corresponding medium: for air the capacitance per unit length is represented by $C_{air\ Ref\ S1}/L1$ (values which are known from calibration of the sensor); for liquid we have $C_{Ref\ S1}/L2$, which instead is measured during operation.

When the container T is filled to a greater extent, and hence to another level h, the level sensor measures the capacitance between the effective portions of the two measuring electrodes furthest away from the bottom of the container itself that are immersed in the liquid and with respect to the corresponding calibration portion of the calibration electrode (it should be noted that the control circuit is perfectly able to identify the aforesaid pair of effective portions, given that in any case the capacitance detected between them is clearly different from the capacitance that would be detected in the case where the aforesaid effective portions were completely in air).

For this purpose, reference may be made to part (c) of FIG. 14, which exemplifies the case of a level h of liquid L that reaches the section S4 of the detection structure of the sensor, the effective portions $EP_4$ and $EP_5$ of the measuring electrodes $3_4$ and $3_5$ being partially immersed in the aforesaid liquid.

As has been described with reference to part (b) of FIG. 14, in the section S4 we will thus have $$C_{m\ S4} = C_{air\ Ref\ S4}(L1-h)/L1 \cdot a_4 + C_{Ref\ S4} \cdot h/L2 \cdot b_4$$

The parameters $a_4$ and $b_4$ are the corrective coefficients for the section S4 mentioned previously, determined during calibration, as likewise the value of $C_{air\ Ref\ S4}$.

$C_{Ref\ S4}$, measured between the calibration portion $EP_r$ of the electrode $3_r$ and the corresponding stretch of the effective portion $EP_5$ of the measuring electrode $3_5$, makes it possible to have a reference value for a different area of the container T (as compared to the case of part (b) of FIG. 14), thus making it possible to take into account the presence of gradients and of lack of homogeneity both of temperature and of composition within the liquid L. Filling of the container T is thus given by L3+h, where L3 corresponds to the height known to the control electronics of the sections S1, S2, and S3, which are evidently immersed in the liquid L, and where h is equal to $$(C_{m\ S4} - C_{air\ Ref\ S4} \cdot C_{air\ Ref\ S4}^{-1}\ Ref\ S4 \cdot a_3) \cdot (b_3 / L2 \cdot C_{Ref\ S4} - a_3 / L1 \cdot$$

For the purposes of identification of the section in which to calculate the value of h, the control circuit can measure the value $C_{Ref\ S(n)}$ and compare this measured value with the value stored for calibration in air $C_{air\ Ref\ S(n)}$, obtained during initial calibration as explained previously: the aforesaid detection and comparison step is carried out for each detection section starting from the bottom, i.e., from the section S1. In this way, the control circuit can identify the detection section in which the detected value of $C_{Ref\ S(n)}$ is equal or close to $C_{air\ Ref\ S(n)}$, namely the detection section in which the calibration portion of the electrode $3_r$ is in air, i.e., is not immersed in the liquid L: at this point, the electronics can identify the value of h, as explained above, for the underlying detection section, and calculate the level of filling as h+L3. In the case where the control electronics does not identify any section where $C_{Ref\ S(n)}$ is equal or close to $C_{air\ Ref\ S(n)}$, this means that also the last section, i.e., the one furthest up, is immersed in the liquid.

Figure 15:
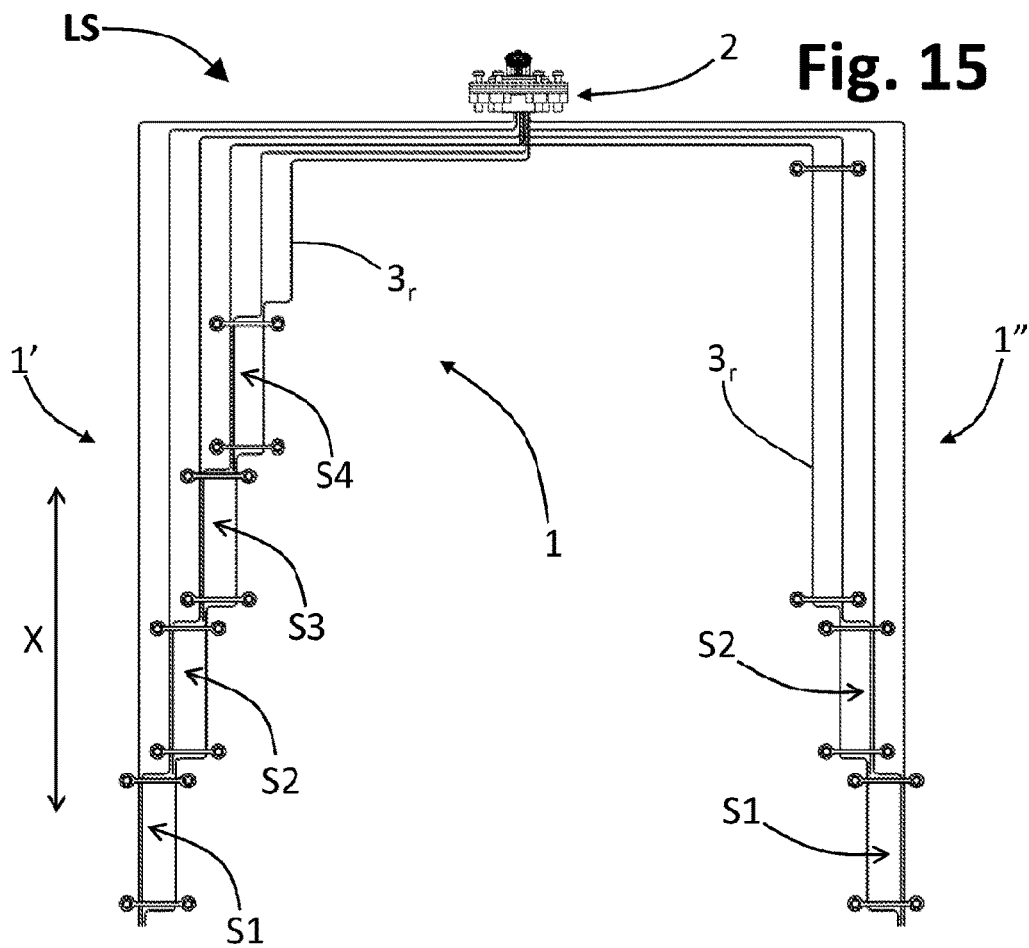
FIG. 15 is a front elevation of a level sensor according to possible embodiments of the invention.

In various embodiments, the level sensor according to the invention comprises a number of level-detection structures, preferably connected to one and the same electrical-connection structure 2. For instance, FIG. 15 illustrates the case of a sensor LS that comprises one first said level-detection structure 1' and one second level-detection structure 1", which extend in generally side-by-side positions in the direction of length X and which are both connected to the structure 2. In the case exemplified, the two structures 1' and 1" are each provided with a calibration electrode $3_r$ of the type mentioned previously, but this does not constitute a strictly essential characteristic.

The two or more detection structures may comprise a different number of detection sections. Once again with reference to the case of FIG. 15, the structure 1' includes four detection sections S1-S4, whereas the other structure 1" includes just two sections S1 and S2. Configurations of this sort are, for example, useful in the cases where the container or tank containing the liquid the level of which is to be detected includes a number of distinct compartments or else a number of distinct storage areas, for example the so-called saddle tanks, in particular fuel saddle tanks of vehicles.

Figure 16:
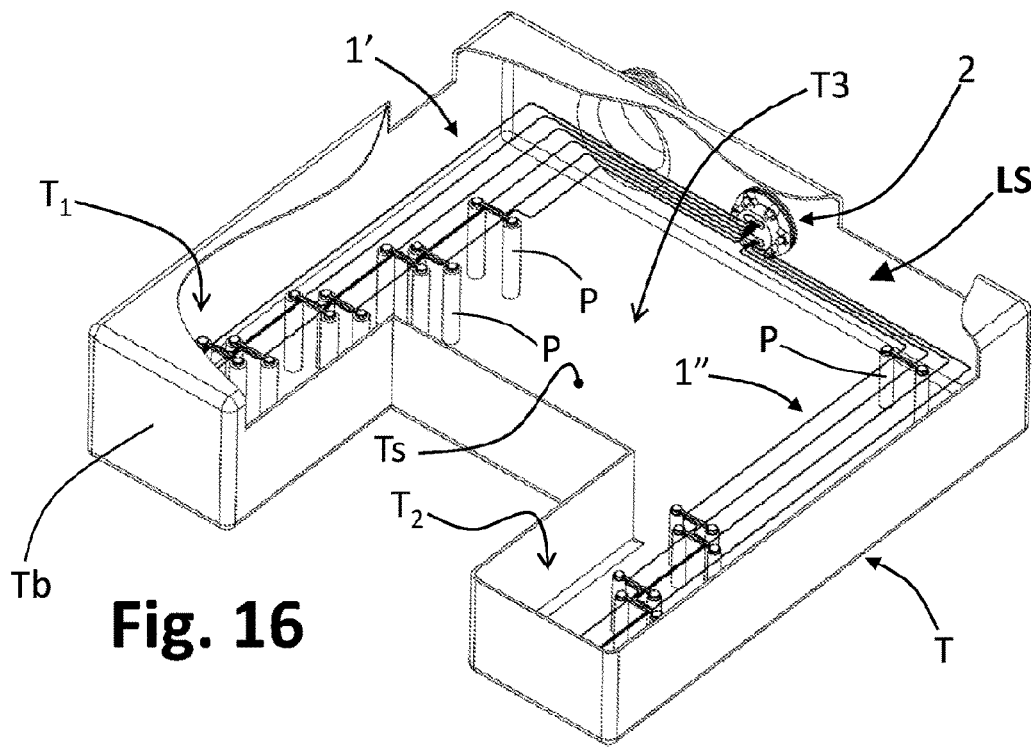
FIG. 16 is a partially sectioned schematic perspective view of a generic container, mounted in which is a level sensor of the type illustrated in FIG. 15.

FIG. 16 exemplifies for this purpose the case of a container or tank with a number of compartments or storage areas distinct from one another, such as a tank for vehicles, for example of the so-called saddle-tank type, the bottom Tb of which is shaped so as to define two distinct lower storage areas denoted by $T_1$ and $T_2$, which are generally parallel to one another, which are overlaid by a common storage area $T_3$ (of course each of the areas $T_1$ and $T_2$ has a respective outlet for the liquid, not represented).

Each of the two structures 1' and 1" extends, in the direction of length, in part in a respective lower storage area $T_1$ and $T_2$ and in part through the common storage area $T_3$. It will hence be appreciated that, via the lowest detection section or sections of each structure 1' and 1" (for example, the sections S1 and S2 of each structure of FIG. 15) it will be possible to detect independently the presence and the level of the liquid in each of the two lower storage areas $T_1$ and $T_2$, whereas the remaining detection sections of the structure 1' (for example, the sections S3 and S4 of the structure 1' of FIG. 15) may used for detecting the presence and the level of the liquid present in the common storage area $T_3$.

In general, hence, in the case of a level sensor comprising a number of level-detection structures connected to one and the same electrical-connection structure 2 (as in the example of FIGS. 15 and 16) even only one of the detection structures could comprise sections (such as the sections S3 and S4), dedicated to detection of the presence and of the level of liquid present in a common storage area (such as the area $T_3$).

In the example of FIG. 16, supports P are represented, integrated or fixed to at least one side wall Ts of the container or tank T or, more in general, a wall that substantially extends alongside the level sensor 1 or the corresponding electrodes, where the aforesaid supports P are coupled to positioning elements of the level sensor.

In various embodiments, the detection structure or structures of the level sensor has/have a plurality of consecutive areas that extend according to respective planes generally angled with respect to one another, with the various electrodes that have respective bends in a position corresponding to each region of transition between consecutive areas.

Figure 17:
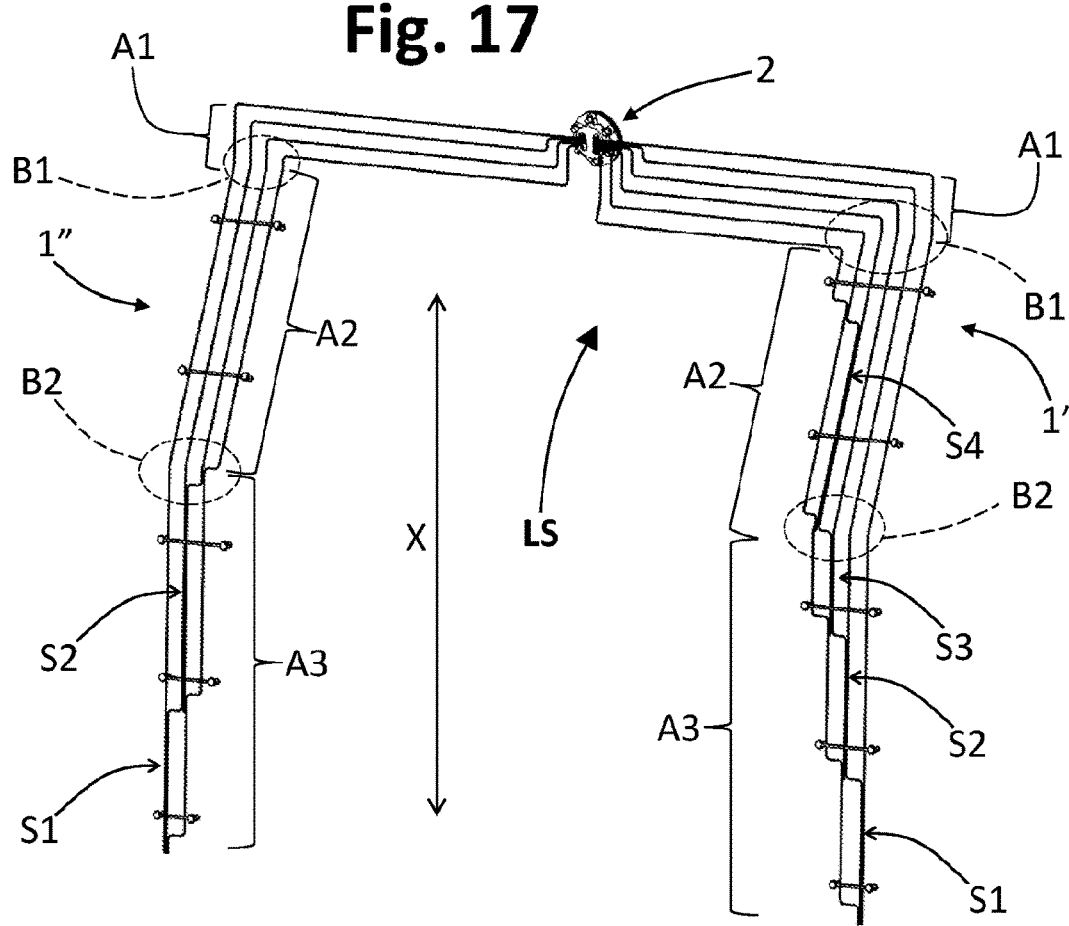
FIG. 17 is a schematic perspective view of a level sensor according to possible embodiments of the invention.

An example of this type is illustrated in FIG. 17, where the level sensor LS is built in a way similar to the one shown in FIG. 15 and comprises two detection structures 1' and 1" set alongside one another in the direction of length X. Each structure 1' and 1" substantially includes three different areas differently inclined with respect to one another in the direction X, which are denoted by A1, A2, and A3. For this purpose, in positions corresponding to the regions of transition between the sections A1-A2 and A2-A3, the electrodes of the two sections 1' and 1" have respective bends; the aforementioned regions of transition are denoted by B1 and B2 in FIG. 17. In the example, the areas A1 of the two structures 1' and 1" substantially include portions of the various electrodes, which basically have the purpose of providing a connection to the structure 2, i.e., portions that are not effective for the purposes of the level detection; likewise, the area A2 of the structure 1" does not include level-detection sections either, whereas the area A2 of the structure 1' includes just the detection section S4; finally, the area A3 of the structure 1' includes the respective detection sections S3, S2, and S1, whereas the area A3 of the structure 1" includes the respective detection sections S2 and S1. Configurations of this sort may prove useful in the case of containers for liquid, for example vehicle tanks, that have complex geometrical configurations, for example distinguished by the presence of walls with irregular profile that do not allow the use of a rectilinear detection structure.

Figure 18:
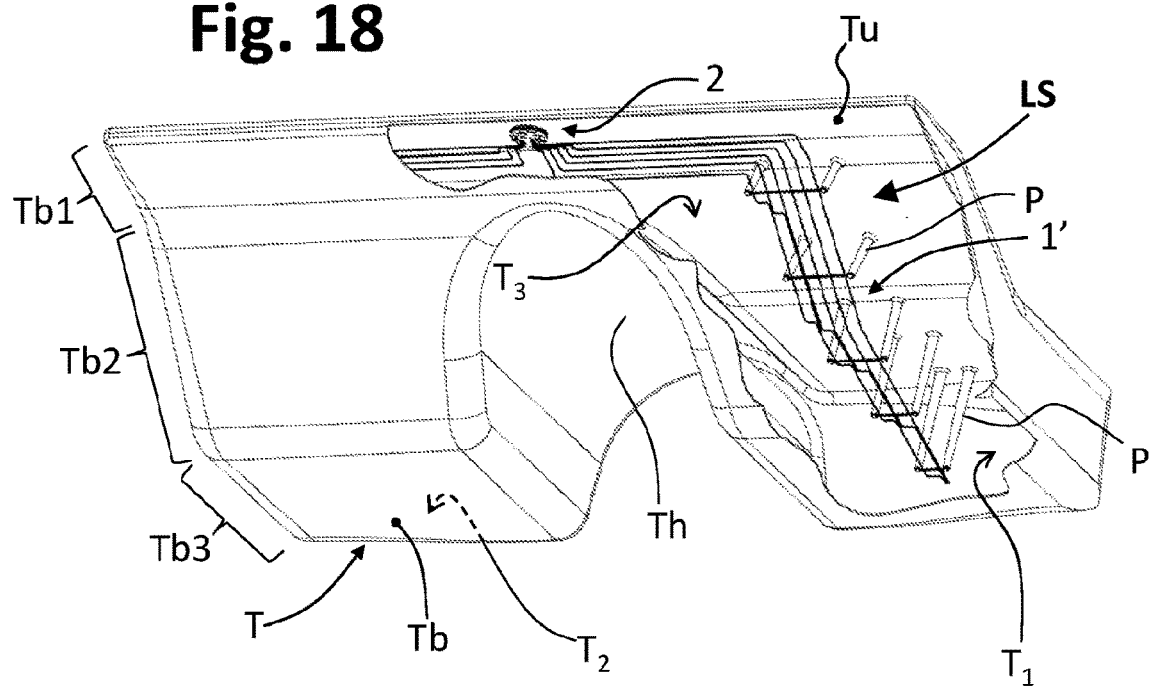
FIGS. 18-19 are partially sectioned schematic perspective views of a generic container, mounted in which is a level sensor of the type illustrated in FIG. 17.
Figure 19:
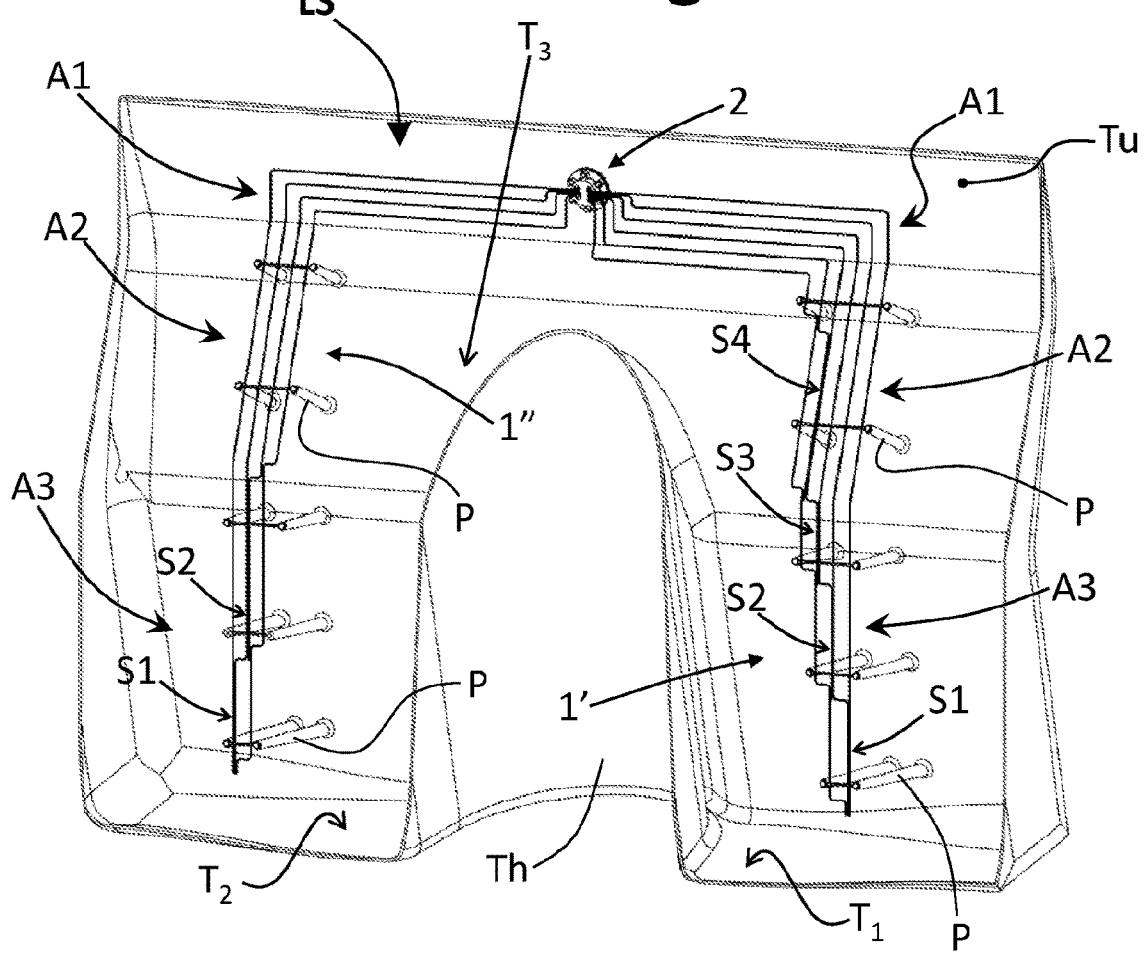

For instance, FIGS. 18 and 19 exemplify the case of a container 7 with two compartments or of the saddle type, for example a vehicle tank, which has a shaped intermediate area Th, substantially having a vault shape, which defines within the container T two areas $T_1$ and $T_2$ for storage of liquid, as already seen in relation to FIG. 16. In this case, at least the bottom wall is moreover distinguished, at least at each area $T_1$ and $T_2$, and preferably also at the area $T_3$, by wall portions that are angled with respect to one another.

In FIG. 18, these wall portions are denoted by Tb1, Tb2, and Tb3, of which at least the wall portions Tb2 and Tb3 correspond to the storage area $T_2$: for simplicity, it will be assumed that the bottom wall Tb is shaped in a similar way at the area $T_1$, (even though in this area $T_1$ the bottom wall could be differently angled, or even substantially plane). The level sensor LS is in this case secured to the upper wall Tu of the container T, thanks to supports P of different height, which substantially extend towards the bottom wall Tb.

With reference also to FIG. 19 (where the bottom wall Tb is not represented), the arrangement is such that the lower ends of the lower detection sections of the sensor LS, i.e., the sections S1 of the two structures 1' and 1" , are each located in the proximity of the bottom wall Tb, whereas the upper end of the detection section S4 of the structure 1' is located in the proximity of the upper wall Tu. In this way, via the sections S1 and S2 of each structure 1' and 1" it will be possible to detect the level of liquid within each storage area $T_1$ and $T_2$, independently of one another, and via the sections S3 and S4 of the structure 1' it will be possible to detect the level of liquid in the common storage area $T_3$ of the container T, as already described with reference to the embodiments of FIGS. 15-16.

Of course, the solution of envisaging differently angled areas of a detection structure can be used also in the case of level sensors that include just one such structure, like the ones represented in FIGS. 1-15.

Exemplified in FIGS. 20 to 33 are various possible embodiments of positioning and/or fixing elements that can be used for securing in relative positions the electrodes at each detection section of the level sensor LS, i.e., or can be used for fixing a sensor LS or the corresponding electrodes in a position corresponding to at least one wall Tu, Tb, Ts of the container or tank T.

Figure 20:
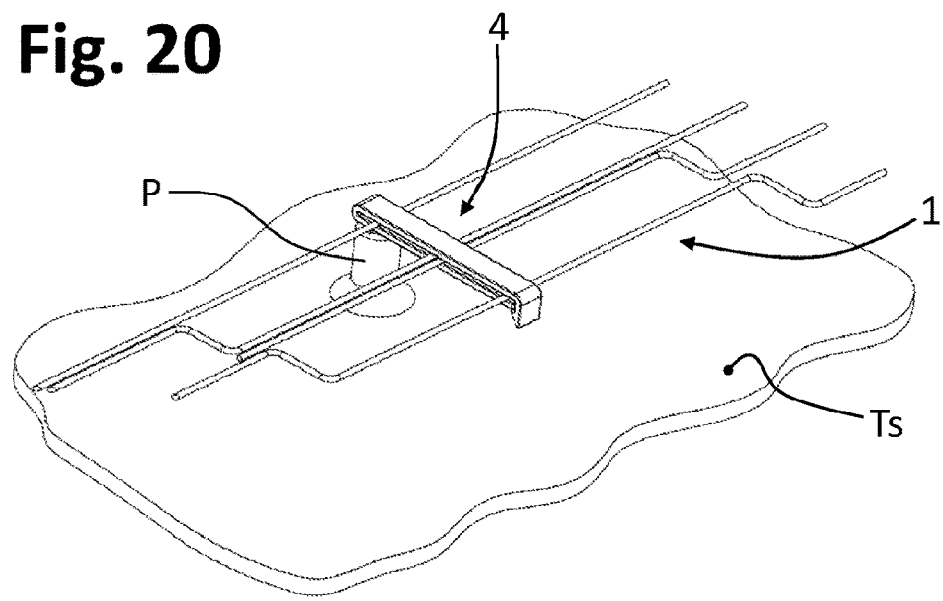

FIGS. 20-21 illustrate the case of a positioning element 4, the body of which is designed to extend in a direction transverse to the electrodes of a section of detection structure and that includes two portions that can be closed by snap action, with respective stretches of the electrodes set in between. The aforesaid body may be conveniently made of a suitable plastic material, for example via moulding. In the example, two elongated portions 20a and 20b are thus provided, joined together by a hinge portion 20c, where, at the end of the portion 20b opposite to the hinge portion 20c, a hooking element 20d may be provided, for example in the form of an elastic tooth, to secure firmly the two parts 20a and 20b to one another. The lower portion of the element 4, here the portion 20a, is provided with a part 20e for fixing, for example via snap action, or in a threaded way, or with interference, to a corresponding support P defined in a wall of the container containing the liquid the level of which is to be detected, for example a side wall Ts.

Preferentially, in at least one of the facing surfaces of the portions 20a and 20b transverse positioning seats 20f are defined for corresponding electrodes of a detection structure 1.

Figure 24:
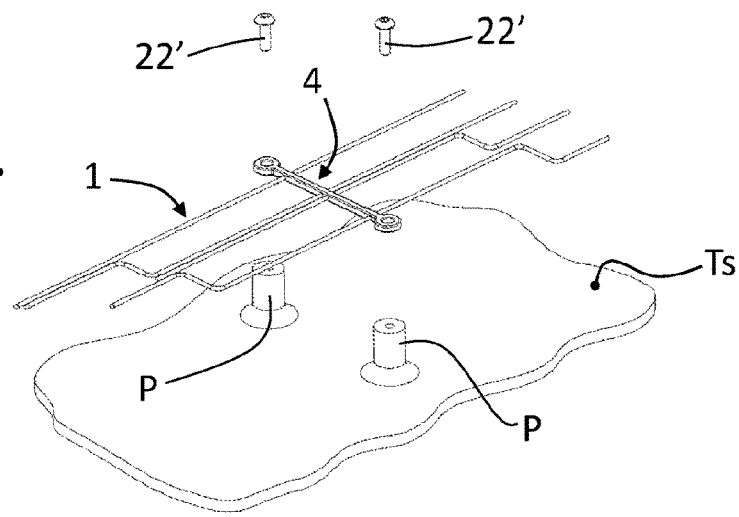

FIGS. 22-24 represent a positioning element 4, the body of which is overmoulded in a direction transverse to corresponding stretches of the electrodes of a structure 1 and which defines, at its two ends, through seats (not indicated) for corresponding members for fixing to two supports P. In the example of FIGS. 22-23, the aforesaid fixing members, designated by 22, engage in a snap-action way or with interference, whereas in the case of FIG. 24 threaded members or rivets 22' are provided.

Figure 25:
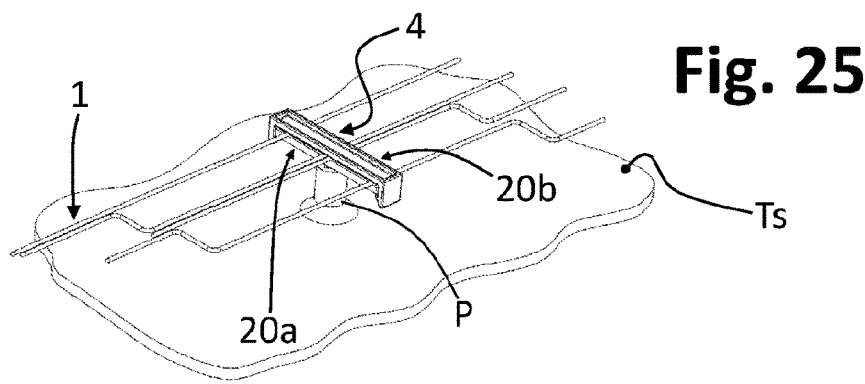
Figure 26:
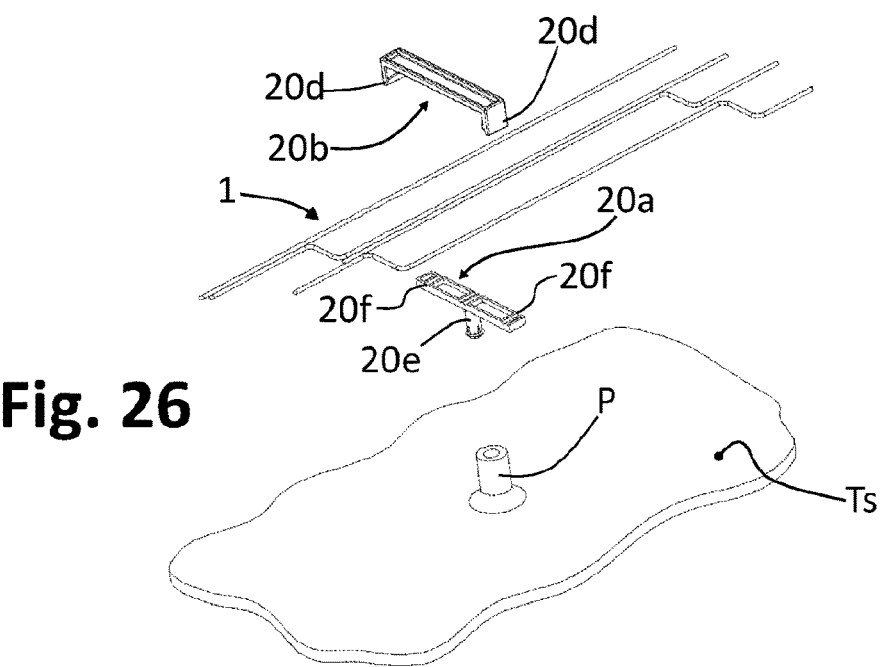

FIGS. 25-26 regard a version of positioning element similar to that of FIGS. 20-21 but in which the two body portions 20a and 20b are configured as distinct parts. In this case, one of the two portions here the portion 20b has at its two opposite ends respective hooks 20d, for example in the form of elastic teeth, for blocking the portion 20b on the portion 20a, with respective stretches of the electrodes set in between. Also in this case, the portion 20a is provided with a part 20e for fixing, for example via snap action, or by threaded connection, or with interference, to a corresponding support P, and defined in at least one of the facing surfaces of the portions 20a and 20b are transverse positioning seats 20f for the electrodes.

Figure 27:
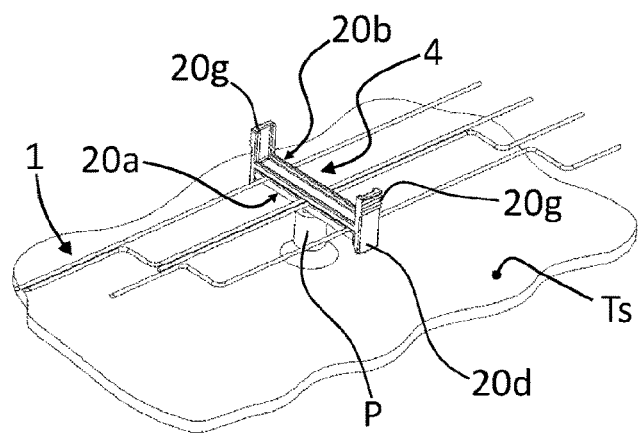

FIG. 27 illustrates a solution of a positioning element, which is structurally similar to that of FIGS. 25-26, but in which the hooks 20d are provided with levering tabs 20g aimed at facilitating, in the case of need, divarication of the hooks themselves, and hence the separation of the portions 20a and 20b.

Figure 28:
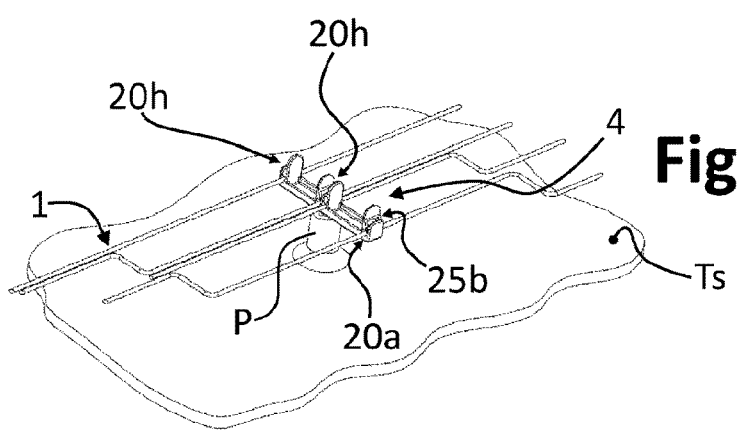
Figure 29:
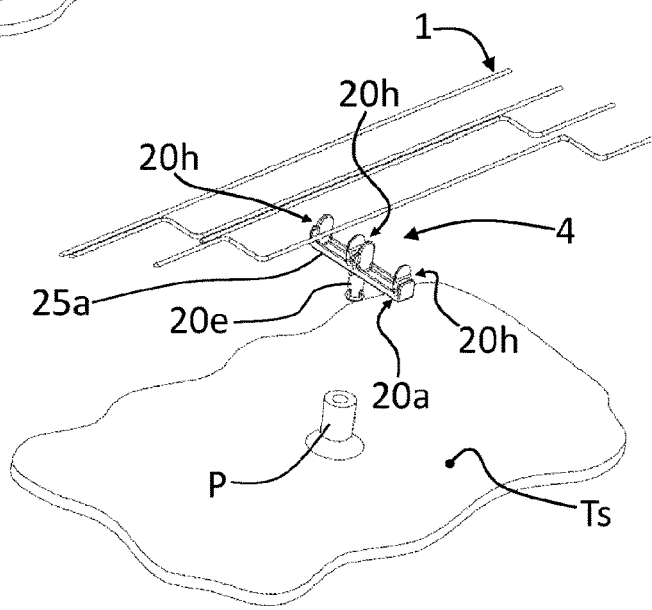

FIGS. 28 and 29 exemplify a positioning element 4 in which elastic-engagement seats are provided for corresponding electrodes of a detection structure 1. In the example, the body of the element 4 consists of a transverse portion 20a, provided at the bottom with a part 20e for fixing to a support P, and provided at the top with elastic engagement elements 20h for engaging corresponding electrodes. The engagement elements 20h may, for example, comprise two elastically flexible tabs, which rise substantially parallel from the portion 20a and have respective mutually facing inner surfaces. Defined on the inner surface of a first of the aforesaid tabs is a relief, for example in the form of a tooth, which elastically faces or is pressed against the inner surface of the second opposite tab, for example at an area corresponding to a homologous tooth of the aforesaid second tab.

Conveniently the relief or reliefs can define an upper inclined plane so as to favour insertion of an electrode between the two tabs. In practice, the electrode is pressed between the two tabs, in the direction of the portion 20a of the element 4, in order to bring about elastic divarication of the tabs themselves and thereby enable the electrode to pass beyond the relief or reliefs mentioned previously. Once it passes beyond the relief or the two opposed reliefs, the tabs once again assume elastically their generally parallel configuration so that the relief or reliefs withhold the electrode in position. On the upper surface of the portion 20a, at an area comprised between the two tabs, a transverse seat may be defined for at least partial housing of a corresponding stretch of the electrode.

Figure 30:
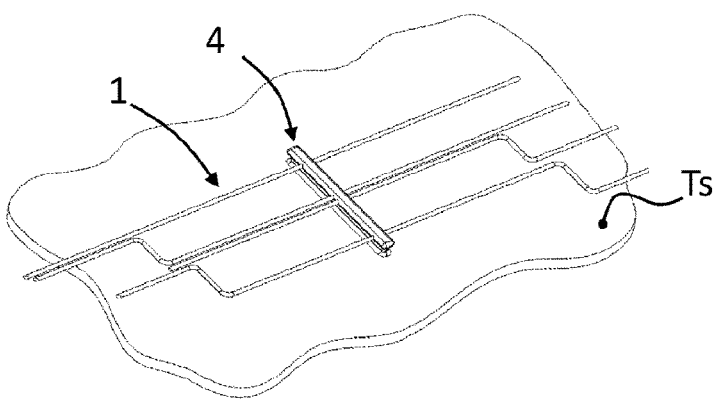
Figure 31:
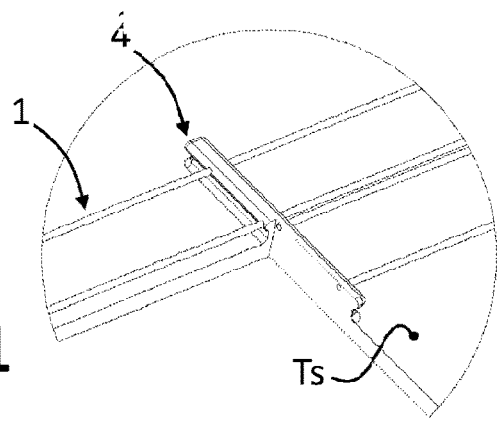

FIGS. 30 and 31 regard a positioning element that is defined integrally, in a single piece, with a wall Ts of the container the level of liquid in which is to be measured, i.e., a positioning element 4 that integrates also the function of supporting the elements designated previously by P. In such an embodiment, the wall Ts in question, preferably made of a plastic material, is moulded in such a way that its respective portions, which provide the elements 4, surround the electrodes: basically, then, the wall Ts is locally overmoulded on respective stretches of the electrodes.

Figure 32:
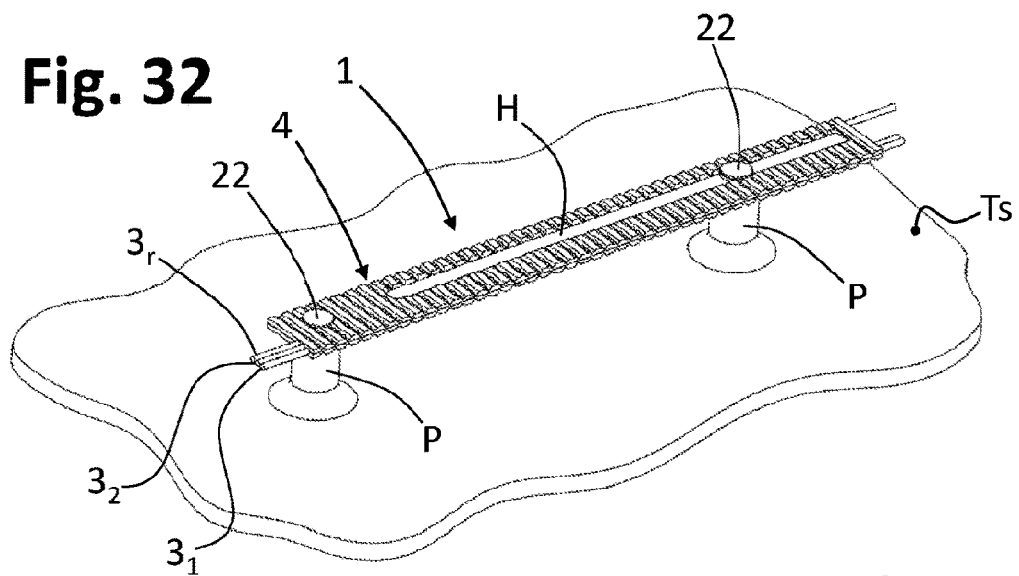
FIGS. 32 to 33 are partial and schematic perspective views of a level sensor according to possible embodiments of the invention and of possible embodiments of a positioning and/or fixing element.
Figure 33:
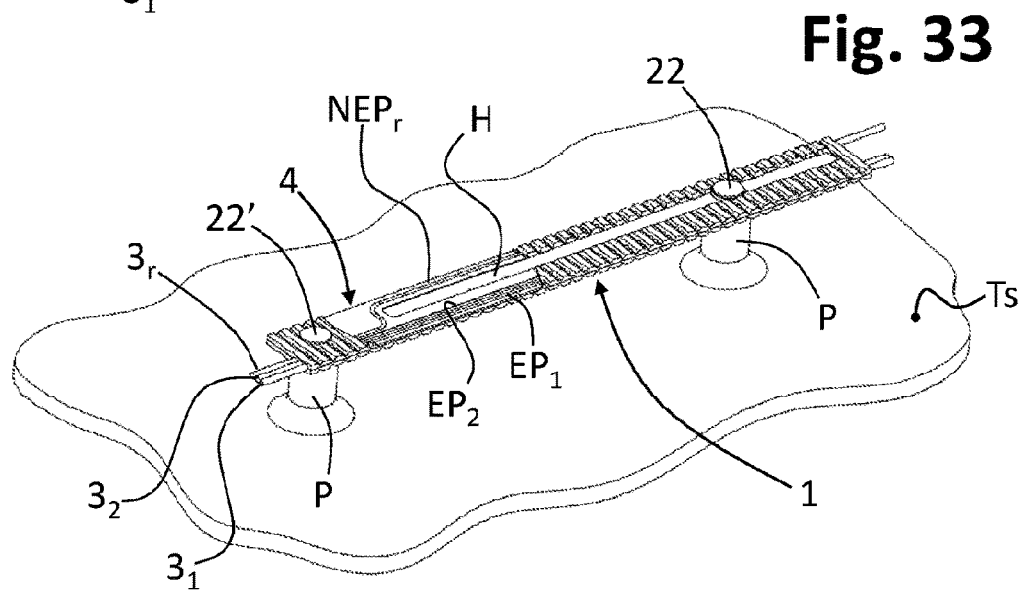

FIGS. 32 to 33 exemplify the case where the positioning element 4 includes a longitudinally extending body that is overmoulded on at least one corresponding longitudinally extending portion of a detection structure, i.e., on two or more electrodes thereof.

Within the aforesaid overmoulded body there may be defined one or more through openings H, for example in the form of holes or slots, at areas not traversed by the electrodes, where members 22 are provided for coupling to corresponding supports P, for example engagement members of a snap-action type or with interference or of a threaded-connection type. For instance, with reference to FIG. 33, a through opening H in the form of slot is defined in the body overmoulded at an area comprised between the effective portion $EP_2$ of the electrode $3_2$ and a non-effective portion $NEP_r$ of the calibration electrode $3_r$; another through opening (not indicated), in the form of a hole, is instead provided in the overmoulded body in position corresponding to the fixing member designated by 22'.

Of course, the positioning members of the detection structure of a level sensor according to the invention do not necessarily all have to be the same as one another, it being possible to envisage, for example, the combined use of different elements 4 according to FIGS. 20 to 32.

As mentioned previously, the electrodes of the level sensor according to the invention do not necessarily have to be in contact with the liquid, it being possible for them to be isolated therefrom. In various embodiments of this sort, at least the detection structure 1 of the sensor, or each detection structure 1', 1" thereof, may be provided with an electrically insulating coating or casing. Such a casing may be at least in part formed by an overmoulding of electrically insulating material, or else in at least two parts fixed together in a fluid-tight way, for example welded or glued, with the electrodes set in between.

Figure 34:
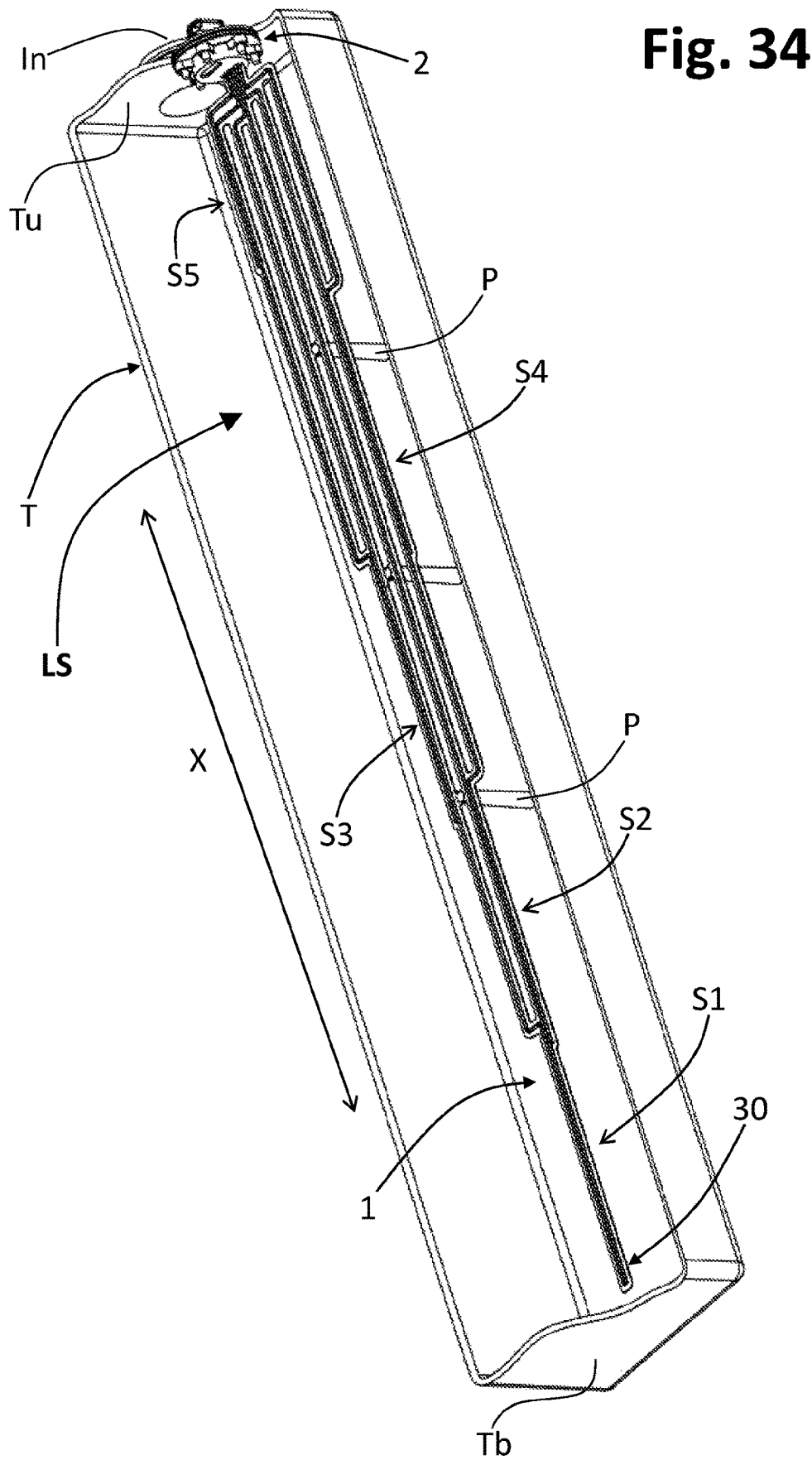
FIG. 34 is a partially sectioned schematic perspective view of a generic container, mounted in which is a level sensor according to possible embodiments of the invention.
Figure 35:
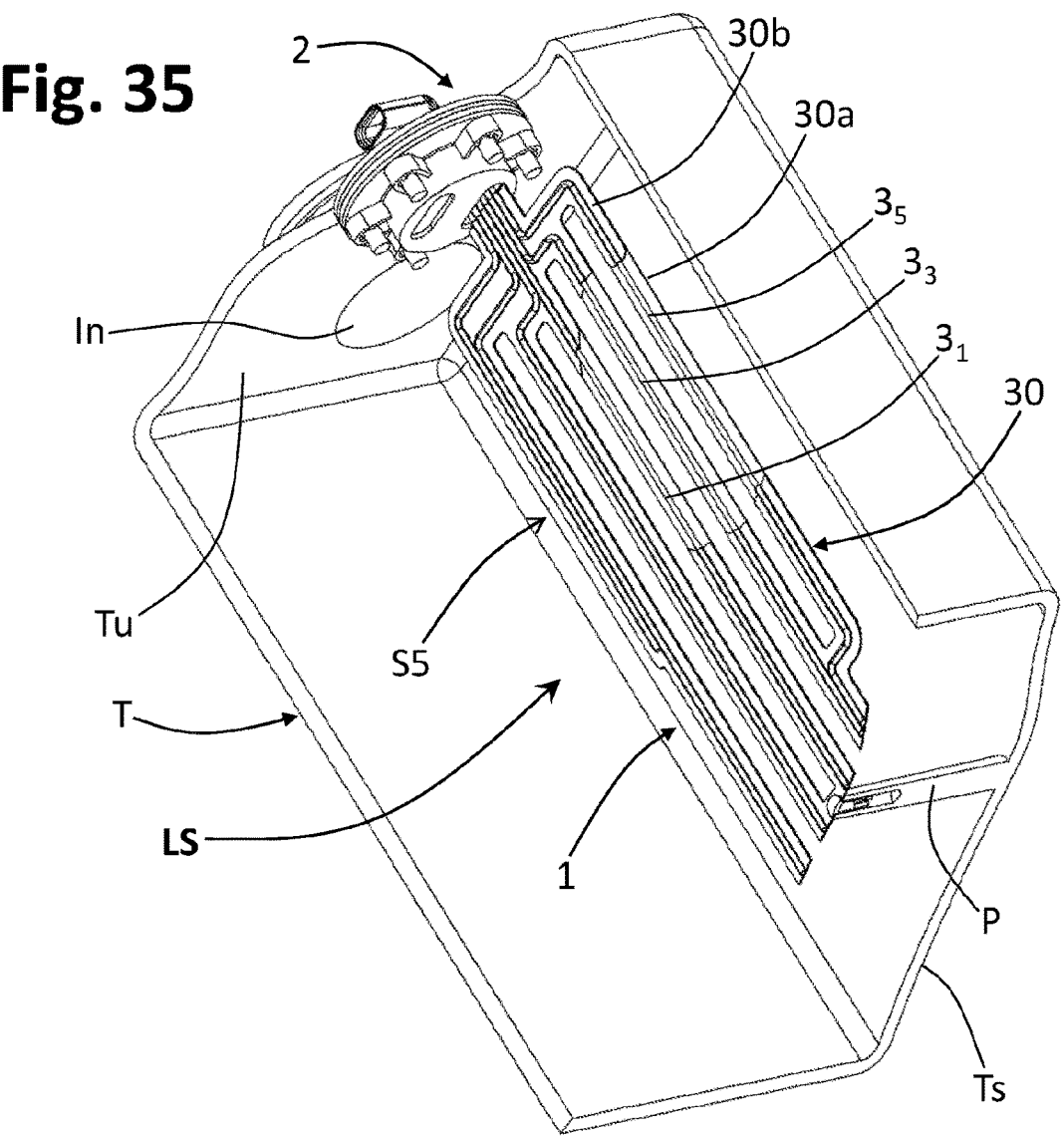
FIGS. 35 to 36 are details of FIG. 34.
Figure 36:
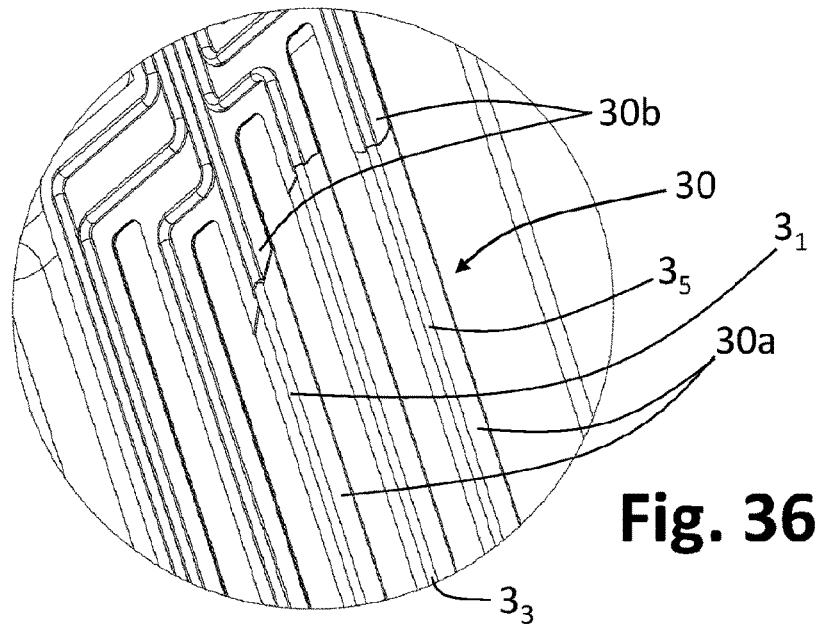

FIG. 34 illustrates, for example, a version of sensor LS with electrodes isolated from the liquid, i.e., provided with a casing or coating designated as a whole by 30. As may be noted in the details of FIGS. 35 and 36, the casing 30 may include two parts 30a and 30b associated to one another with the electrodes set in between, for example welded together. In the example illustrated, a part 30a is substantially plane, whereas the part 30b has a profile at least in part complementary to that of the electrodes, it being, for example, possible to obtain this shaping during assembly, in particular when the part 30b is sufficiently thin (for example, in the form of a film) and is heat-sealed on the part 30a. In applications of this sort, the part 30a can also be relatively thicker than the part 30b, in order to obtain a sort of supporting structure for the electrodes, even though this is not strictly necessary. Advantageously, the casing 30 may also be exploited in order to fix the sensing part of the sensor inside a container T, as exemplified in FIGS. 34 to 35, in particular exploiting supports P integrated in the container itself, as mentioned previously. The two parts of the casing 30 could, however, be the same as, or symmetrical to, one another, i.e., each having a profile at least in part complementary to a respective part of the electrodes, for example in the form of films.

It will be appreciated that, in embodiments of this type, the casing can perform completely or partially the function of ensuring proper relative positioning of the electrodes, for example at the distances d1, d2 and possibly d3 mentioned previously.

The coating 30 could also be of an overmoulded type, or else in the form of a insulating layer or coating applied on the electrodes, such as a layer made of Teflon or other electrically insulating material. The coating is preferably designed as a whole for enclosing all the electrodes of the sensor, as in the case exemplified, but not ruled out is the case of a coating formed by a number of parts that each enclose a single electrode: consider, for example, an electrode enclosed in a respective sheath, such as an electrically insulated wire, in which case it will, however, be preferable to envisage a plurality of positioning elements, for example of the types designated previously by 4. Insulating shells could, moreover, be obtained starting from plane sheets, shaped by thermoforming and welded together using any known technique, such as vibration welding, hot-blade welding, laser welding, etc.

Also the conductive elements of the sensor, represented in the examples by bars with circular section, could be obtained from metal foils (steel, aluminium, copper, or other suitable conductor) and shaped like electrodes using techniques of selective chemical etching (for example, the technique also known by the term "etched foil"). The thickness of the foils may be comprised between 1 and 500 preferably comprised between 30 and 150 In the case of etched-foil technology, the protective layers may, for example, be constituted by polymeric films of a thickness comprised between 10 and 600 preferably between 40 and 150 The covering foils or films may be chosen on the basis of the type of chemical agents in which the sensor is to operate, for example high-density polyethylene (HDPE), polypropylene, polymeric multilayer films with high barrier effect, etc.

Figure 37:
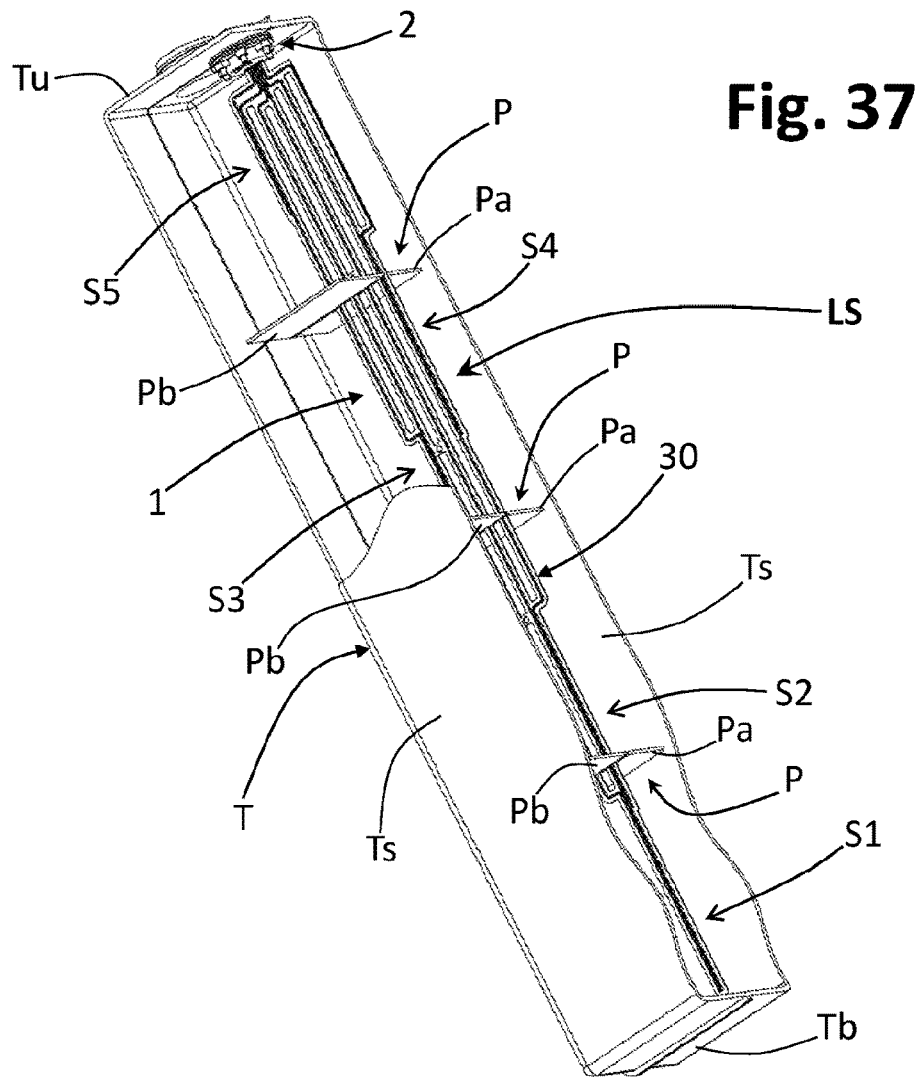
FIG. 37 is a partially sectioned schematic perspective view of a generic container, mounted in which is a level sensor according to possible embodiments of the invention.
Figure 38:
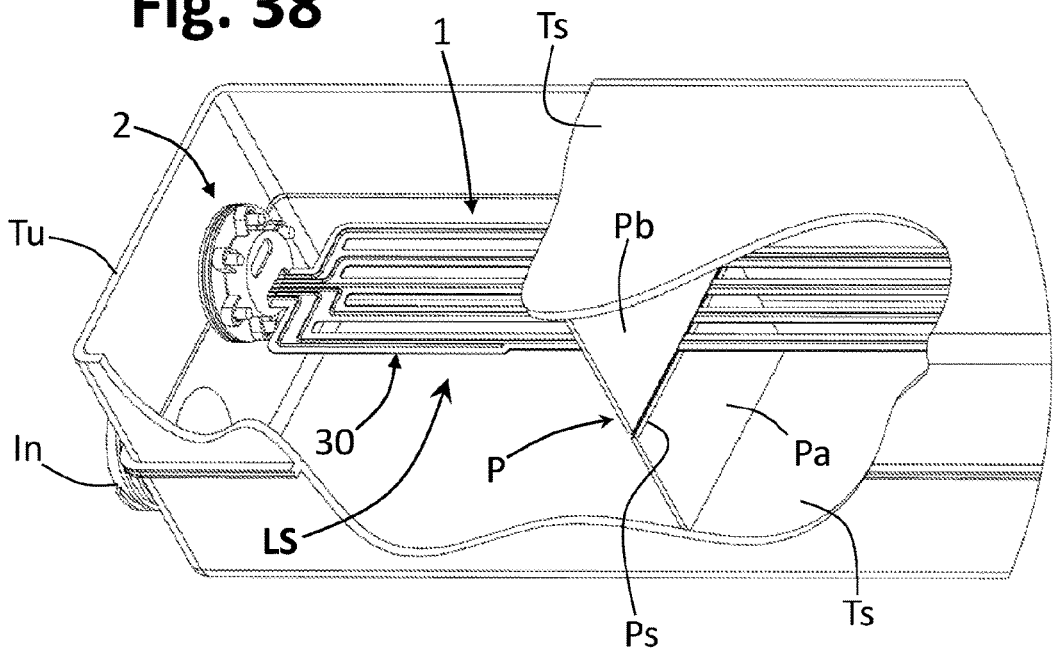
FIG. 38 is a partial and schematic sectioned perspective view of the container of FIG. 37.

FIGS. 37 and 38 exemplify a further possible variant embodiment, in which the supports P integrated in the container T that are to receive the level sensor define respective seats in which there can be locally inserted a detection section of the sensor. The supports P may in this case comprise, for example, opposed walls that define between them a slit or gap, in which the detection section of the sensor can be inserted in a transverse direction. Applications of this type are particularly advantageous in the case where the detection structure 1 of the sensor, or each detection structure 1', 1" thereof, includes an insulating casing having as a whole a prevalently plane and/or thin structure, such as a casing of the type designated previously by 30.

In the example of FIGS. 37 and 38 the casing 30 is sufficiently rigid to ensure maintenance of the correct relative position between the electrodes, without any need for positioning elements of the type designated previously by 4. As may be noted, also in this case provided within the container T are a series of supports P, set at a distance from one another in the direction of length, to which the detection structure 1, i.e., its casing 30, is locally constrained.

In the example, each support P defines a seat, one of which is designated by Ps in FIG. 38, in which the detection structure 1, i.e., its casing 30, can be inserted in a transverse direction (i.e., flat). In the example, the supports P each comprise two small walls Pa and Pb that project towards one another. The upper ends of the two opposed small walls Pa and Pb define between them a slit, which forms the seat Ps, between which there can be inserted possibly with slight interference a corresponding part of the casing 30 of the sensor LS. The small walls Pa and Pb may, for example, be defined each by a respective side wall Ts of the container T, or else may be defined, and project from, one and the same side wall Ts. Of course, one or both of the small walls Pa and Pb of each support P will be sized or shaped so as not to obstruct inflow and outflow of the liquid the level of which in the container T is to be measured.

From the foregoing description, the characteristics of the present invention emerge clearly, as likewise do its advantages.

It is clear that numerous variations may be made by the person skilled in the branch to the level sensor described by way of example, without thereby departing from the scope of the invention as defined in the ensuing claims.

The invention has been described with particular reference to detection of the level of a liquid medium, but, as mentioned, the sensor described can be used in combination with different substances and materials, even ones that may potentially undergo solidification, for example on account of freezing.

The invention claimed is:

1. A level sensor for detecting the level of a medium, comprising an electrical-connection structure and at least one level-detection structure, wherein the at least one level-detection structure comprises a plurality of elongated electrodes, which include at least three level-measuring electrodes, the elongated electrodes being electrically connected to the electrical-connection structure, wherein the elongated electrodes extend at least partially in generally side-by-side positions in a length direction of the at least one level-detection structure and each have a proximal end and a distal end relative to the electrical-connection structure, wherein the at least one level-detection structure is divided, in the length direction, into a succession of level-detection sections, each of which includes two adjacent effective portions of two respective level-measuring electrodes of said plurality of elongated electrodes, the two adjacent effective portions extending to a prevalent extent substantially parallel or equidistant, at a first predetermined distance from each other, in the length direction, wherein in one or more first level-detection sections there also extends in the length direction a non-effective portion of at least one further elongated electrode other than the two level-measuring electrodes that define the two adjacent effective portions of the corresponding first level-detection section, wherein the level sensor is operable for:
applying an electrical potential difference between the two level-measuring electrodes that define the two adjacent effective portions of a corresponding first detection section:

measuring, between said two level-measuring electrodes, a value of a given electrical quantity selected from among impedance, capacitance or resistance; and determining, on the basis of said value, the level of the medium, and wherein at least one of the elongated electrodes has at least one intermediate bend, in a position corresponding to a transition between two consecutive first level-detection sections, in such a way that, at at least one of said first level-detection sections, the non-effective portion of the at least one further elongated electrode extends to a prevalent extent in the length direction at respective second predetermined distances from the corresponding two adjacent effective portions, the second predetermined distances being greater than the first predetermined distance.

2. The sensor according to claim 1, wherein the at least one intermediate bend defines in the corresponding elongated electrode an intermediate step including an electrode portion that is transverse or inclined or arched with respect to the length direction.

3. The sensor according to claim 1, wherein the distal ends of at least some of the elongated electrodes are at different heights in the length direction.

4. The sensor according to claim 1, comprising a control circuit configured for:
applying said electrical potential difference between the two level-measuring electrodes that define the two effective portions of a corresponding first level-detection section;

detecting, between said two level-measuring electrodes, said value of said given electrical quantity; and determining, on the basis of said value, the level of the medium.

5. The sensor according to claim 1, comprising a plurality of positioning elements, which are set at a distance from one another in the length direction and are configured for keeping the elongated electrodes at respective predetermined distances and/or for fixing the elongated electrodes to at least one wall of a container or tank.

6. The sensor according to claim 2, wherein the at least one intermediate bend is configured in such a way that two consecutive portions of the corresponding elongated electrode that are upstream and downstream of the at least one intermediate bend extend substantially parallel to one another.

7. The sensor according to claim 1, wherein the plurality of elongated electrodes comprises a calibration or reference electrode, which is shaped so as to define one or more calibration or reference portions.

8. The sensor according to claim 7, wherein the calibration or reference portion, or each calibration or reference portion, extends in the length direction substantially parallel to the two adjacent effective portions of the two level-measuring electrodes of a corresponding first level-detection section, at respective third predetermined distances from said two adjacent effective portions, the third predetermined distances being shorter than the second predetermined distances, the calibration or reference portion, or each calibration or reference portion, of the calibration or reference electrode having a length in the length direction that is shorter than the length in the length direction of said two adjacent effective portions of the two level-measuring electrodes of the corresponding first level-detection section.

9. The sensor according to claim 1, wherein the at least one level-detection structure has a plurality of consecutive areas that extend according to respective planes generally angled with respect to one another.

10. The sensor according to claim 1, wherein the at least one level-detection structure comprises at least one first level-detection structure and one second level-detection structure.

11. The sensor according to claim 1, wherein the elongated electrodes are at least in part enclosed in a coating made of electrically insulating material substantially impermeable to the medium.

12. The sensor according to claim 4, wherein the control circuit is housed in a casing belonging to the electrical-connection structure, there being electrically connected to the control circuit the proximal ends of the elongated electrodes.

13. A container or tank for a liquid medium, comprising a level sensor according to claim 1.

14. The container or tank according to claim 13, defining at least two areas for storage of the medium in generally side-by-side positions, wherein the level sensor comprises two level-detection structures that each extend at least in part in a respective one said area for storage of the medium, the container or tank being a saddle tank.

15. The container or tank according to claim 13, having within it a plurality of supporting elements for fixing at least one said level-detection structure in position, the supporting elements being set at a distance from one another in a direction of length.

16. The sensor according to claim 4, wherein the control circuit is also configured for connecting the elongated electrodes other than said two level-measuring electrodes to ground.

17. The sensor according to claim 6, wherein the at least one intermediate bend includes a stretch of the corresponding elongated electrode that extends substantially perpendicular to said consecutive portions, in a direction transverse to the length direction.

18. The sensor according to claim 10, wherein the first level-detection structure and the second level-detection structure extend in generally side by side positions.

19. The sensor according to claim 15, wherein the supporting elements are configured for coupling with respective positioning elements belonging to the at least one level-detection structure.

20. A level sensor for detecting the level of a medium, comprising an electrical-connection structure and at least one level-detection structure,
- wherein the at least one level-detection structure comprises a plurality of elongated electrodes, which include at least three level-measuring electrodes and a calibration electrode which is shaped so as to define one or more calibration portions, the elongated electrodes being electrically connected to the electrical-connection structure,
- wherein the elongated electrodes extend at least partially in generally side-by-side positions in a length direction of the at least one level-detection structure and each have a proximal end and a distal end relative to the electrical-connection structure,
- wherein the at least one level-detection structure is divided, in the length direction, into a succession of level-detection sections, each of which includes two adjacent effective portions of two respective level-measuring electrodes of said plurality of elongated electrodes, the two adjacent effective portions extending to a prevalent extent substantially parallel or equidistant, at a first predetermined distance from each other, in the length direction,
- wherein in one or more first level-detection sections there also extends in the length direction a non-effective portion of at least one further elongated electrode other than the two level-measuring electrodes that define the two adjacent effective portions of the corresponding first level-detection section,
- wherein the level sensor is operable for:
  - applying an electrical potential difference between the two level-measuring electrodes that define the two adjacent effective portions of a corresponding first level-detection section;
  - measuring, between said two level-measuring electrodes, a value of a given electrical quantity selected from among impedance, capacitance or resistance; and
  - determining, on the basis of said value, the level of the medium,
- wherein at least one of the elongated electrodes has at least one intermediate bend, in a position corresponding to a transition between two consecutive first level-detection sections, in such a way that, at at least one of said first level-detection sections, the non-effective portion of the at least one further elongated electrode extends to a prevalent extent at respective second predetermined distances from the corresponding two adjacent effective portions, the second predetermined distances being greater than the first predetermined distance,
- wherein the calibration portion, or each calibration portion, of the calibration electrode extends in the length direction substantially parallel to the two adjacent effective portions of the two level-measuring electrodes of a corresponding first level-detection section, at respective third predetermined distances from said two adjacent effective portions, the third predetermined distances being shorter than the second predetermined distances,
- and wherein the calibration portion, or each calibration portion, of the calibration electrode has a length in the length direction that is shorter than the length in the length direction of said two adjacent effective portions of the two level-measuring electrodes of the corresponding first level-detection section.

* * * * *